United States Patent
Hirai et al.

(10) Patent No.: US 9,440,729 B2
(45) Date of Patent: Sep. 13, 2016

(54) HIGH-LIFT-DEVICE, WING, AND NOISE REDUCTION DEVICE FOR HIGH-LIFT-DEVICE

(75) Inventors: Makoto Hirai, Tokyo (JP); Keizo Takenaka, Tokyo (JP); Taro Imamura, Chofu (JP); Kazuomi Yamamoto, Chofu (JP); Yuzuru Yokokawa, Chofu (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 75 days.

(21) Appl. No.: 13/383,702

(22) PCT Filed: Jul. 12, 2010

(86) PCT No.: PCT/JP2010/061777
§ 371 (c)(1),
(2), (4) Date: Jan. 12, 2012

(87) PCT Pub. No.: WO2011/007759
PCT Pub. Date: Jan. 20, 2011

(65) Prior Publication Data
US 2012/0145826 A1   Jun. 14, 2012

(30) Foreign Application Priority Data
Jul. 13, 2009   (JP) ................... 2009-164869

(51) Int. Cl.
*B64C 9/16* (2006.01)
*B64C 3/48* (2006.01)
*B64C 3/50* (2006.01)

(52) U.S. Cl.
CPC .. *B64C 3/48* (2013.01); *B64C 3/50* (2013.01)

(58) Field of Classification Search
CPC ... B64C 9/18; B64C 23/065; B64C 2230/08; B64C 2230/14; B64C 2003/148

USPC ....................... 244/199.4, 215–217
See application file for complete search history.

(56) References Cited

U.S. PATENT DOCUMENTS

| | | | | |
|---|---|---|---|---|
| 1,994,045 A | * | 3/1935 | Nelson ........... | B64C 21/10 244/200 |
| 2,119,089 A | * | 5/1938 | Zaparka ........... | 244/217 |

(Continued)

FOREIGN PATENT DOCUMENTS

| GB | 880417 | 10/1961 |
|---|---|---|
| RU | 2 174 483 | 10/2001 |
| WO | 2007/095931 | 8/2007 |

OTHER PUBLICATIONS

Decision to Grant a Patent issued Sep. 11, 2013 in corresponding Russian Patent Application No. 2012100039/11, with English translation.

(Continued)

*Primary Examiner* — Brian M O'Hara
*Assistant Examiner* — Michael Kreiner
(74) *Attorney, Agent, or Firm* — Wenderoth, Lind & Ponack, L.L.P.

(57) ABSTRACT

In a high-lift-device, a wing, and noise reduction device for a high-lift-device that are capable of reducing noise generated when a flap is extended, preventing deterioration of aerodynamics characteristic when retracting the flap, and preventing an increase in weight, a flap main body (5) disposed so as to be extendable/retractable relative to a main wing and a protruding portion (6A-1) that smoothly protrudes at least at the vicinity of one end portion of a positive-pressure surface (PS) of the flap main body (5) in a direction away from the flap main body (5) are provided.

20 Claims, 18 Drawing Sheets

(56) References Cited

U.S. PATENT DOCUMENTS

| | | | |
|---|---|---|---|
| 2,207,453 A | | 7/1940 | Blume |
| 3,199,813 A | | 8/1965 | Roper |
| 3,596,854 A | * | 8/1971 | Haney, Jr. .................. 244/199.3 |
| 5,738,298 A | | 4/1998 | Ross et al. |
| 5,806,807 A | * | 9/1998 | Haney ........................ 244/199.3 |
| 6,491,260 B2 | | 12/2002 | Borchers et al. |
| 7,207,526 B2 | | 4/2007 | McCarthy |
| 7,661,629 B2 | * | 2/2010 | Shmilovich et al. ...... 244/199.2 |
| 8,096,513 B2 | * | 1/2012 | Mau et al. .................. 244/199.2 |
| 8,695,915 B1 | * | 4/2014 | Jones et al. .................... 244/1 N |
| 8,870,124 B2 | * | 10/2014 | Ireland ........................ 244/200.1 |
| 2001/0030264 A1 | | 10/2001 | Huenecke |
| 2001/0032907 A1 | | 10/2001 | Borchers et al. |
| 2008/0001036 A1 | | 1/2008 | Voogt |
| 2008/0251647 A1 | | 10/2008 | Lorkowski et al. |
| 2009/0127404 A1 | | 5/2009 | Lee et al. |

OTHER PUBLICATIONS

Decisison to Grant a Patent issued Apr. 23, 2013 in corresponding Japanese Application No. 2009-164869.

International Search Report issued Aug. 17, 2010 in corresponding International Application No. PCT/JP2010/061777.

Notice of Allowance issued Dec. 10, 2013 in corresponding Canadian Application No. 2,767,990.

Communication under Rule 71(3) EPC issued Dec. 12, 2013 in corresponding European Application No. 10 799 817.1.

Notification of the Decision to Grant a Patent Right for Patent for Invention issued Jan. 14, 2015 in corresponding Chinese Patent Application No. 201080031359.5 with English Translation.

Decision to Grant a Patent issued Sep. 18, 2014 in corresponding European patent application No. 10799817.1.

* cited by examiner

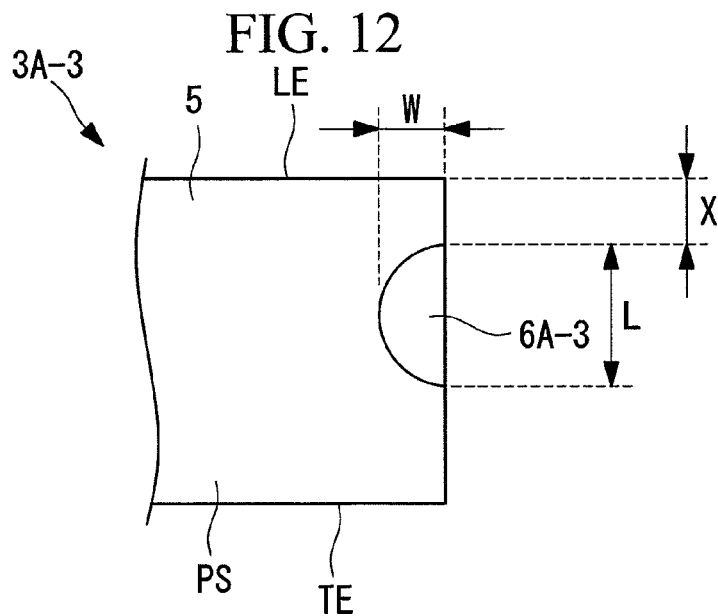
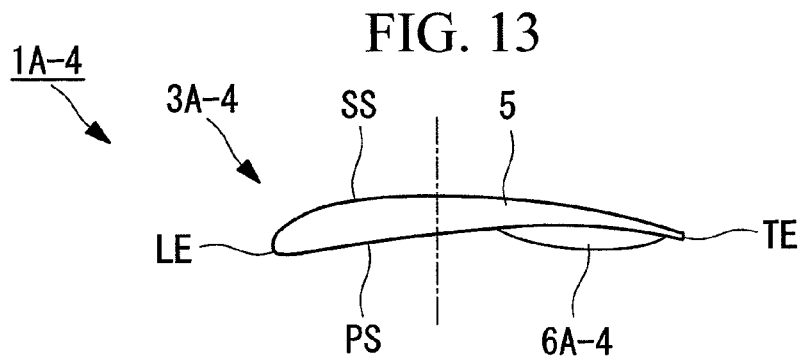
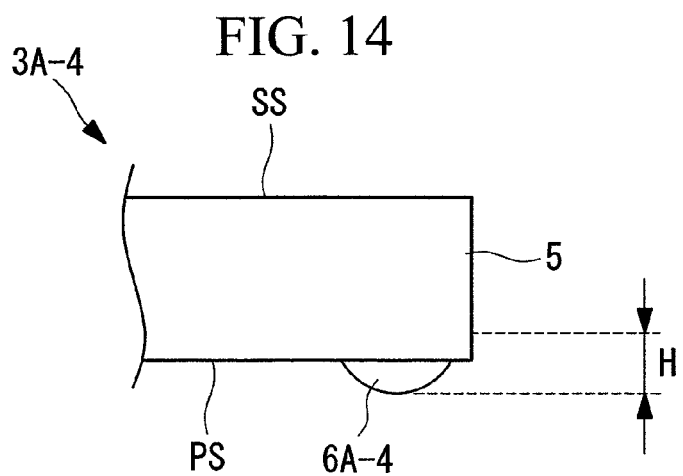

HIGH-LIFT-DEVICE, WING, AND NOISE REDUCTION DEVICE FOR HIGH-LIFT-DEVICE

TECHNICAL FIELD

The present invention relates to, for example, a high-lift-device, a wing, and a noise reduction device for a high-lift-device that are suitable for suppressing the occurrence of aerodynamic noise.

BACKGROUND ART

Noise from the aircraft at the time of taking off and landing is a serious problem in the environment around an airport. The noise that is considered to be a problem includes engine noise emitted from an engine and aerodynamic noise emitted from a high-lift-device (for example, a slat, a flap, etc.) and landing gear.

With regard to the high-lift-device, which is one of the sources of the noise described above, because it is a device for obtaining aerodynamics characteristic required at the time of take-off/landing of an aircraft, its design has focused on the aerodynamics characteristic, whereas a design in consideration of noise reduction has not been incorporated.

Accordingly, in current aircraft, there is no known example in which, for example, a structure that reduces noise emitted from a flap, which is a high-lift-device, is included in the flap.

In the recent years, however, because the noise has become a serious problem as described above, efforts for reducing noise are also being made for a high-lift-device. For example, techniques for reducing noise emitted from a flap, which is a high-lift-device, have been proposed (for example, see Patent Literatures 1 to 3).

CITATION LIST

Patent Literature

{PTL 1} U.S. Pat. No. 6,491,260, Specification.
{PTL 2} U.S. Pat. No. 5,738,298, Specification.
{PTL 3} U.S. Patent Application No. 2001/0030264, Specification.

SUMMARY OF INVENTION

Technical Problem

Although Patent Literature 1 discloses a technique in which a pile fabric is attached at an end of a flap, there is a problem with practical implementation due to a problem with the maintainability of the pile fabric.

Patent Literature 2 discloses a technique in which a negative-pressure surface (top surface) of a main wing is provided with a movable auxiliary flap or the like that generates a counter vortex that inhibits the occurrence of a trailing vortex, that is, a vortex that extends rearward from an end of a flap.

However, with a method in which a movable auxiliary flap is provided as described above, there is a problem in that a drive unit that drives the auxiliary flap needs to be provided and the weight of the aircraft increases. There is a problem in that an influence of an increase in weight due to a drive unit is considerable particularly for small to medium aircraft.

Patent Literature 3 discloses a technique for reducing noise generated from a flap by providing a plate-like fence, which is formed in various shapes, at an end of the flap.

However, with a fence that protrudes on a negative-pressure surface side of (above) a flap, there is a problem with practical implementation because the fence and a main wing interfere with each other when retracting the flap provided with the fence into the main wing.

On the other hand, with a fence that protrudes on a positive-pressure surface side of (below) a flap, there is a problem in that the above-described noise reduction effect was not confirmed in experiments by the inventors and noise reduction effects cannot always be obtained.

Furthermore, because a portion/site for a flap is smaller in small to medium aircraft as compared with a large aircraft, there is a problem in that there is limited space for installing a movable noise reduction mechanism, and it is difficult to install a noise reduction mechanism.

The present invention has been conceived to solve the above-described problems, and an object thereof is to provide a high-lift-device, a wing, and a noise reduction device for a high-lift-device that are capable of reducing noise generated when a flap is extended, preventing deterioration of aerodynamics characteristic when the flap is retracted, and preventing an increase in weight.

Solution to Problem

The present invention employs the following solutions in order to achieve the above-described object.

A high-lift-device according a first aspect of the present invention is provided with a flap main body that is disposed so as to be extendable/retractable relative to a main wing; and a protruding portion that smoothly protrudes at least at the vicinity of one end portion of a positive-pressure surface of the flap main body in a direction away from the flap main body.

With the above-described first aspect, when the flap main body is extended from the main body, a wing-tip vortex generated at an end portion of the flap main body can be weakened, and, additionally, the wing-tip vortex can be moved away from the surface of the flap main body.

Specifically, the wing-tip vortex is a flow of air at the end portion of the flap main body that flows toward a negative-pressure surface from the positive-pressure surface of the flap main body, and this flow of air can be weakened by providing the protruding portion. Furthermore, because the above-described flow of air is diverted via the protruding portion, the above-described flow of air can be guided toward a position away from the surface of the flap main body.

Because the protruding portion is a fixed member that smoothly protrudes from the positive-pressure surface of the flap main body and requires no drive mechanism, as compared with other device that require a driving mechanism, it is less likely that extending/retracting of the flap main body will be adversely affected.

Furthermore, although the protruding portion protrudes from the main wing in a state in which the flap main body is retracted into the main wing, that is, in a state in which an aircraft provided with the high-lift-device of the present invention is cruising, because the protruding portion is formed smoothly, in other words, in a streamlined shape, aerodynamics characteristic at the high-lift-device can be prevented from deteriorating.

In the above-described first aspect, it is desirable that the protruding portion be formed so as to extend along an end portion of the flap main body, and end portions of the protruding portion at a leading edge side and a trailing edge side of the flap main body be shorter in a span direction of the flap main body as compared with substantially a center of the protruding portion.

By doing so, because the protruding portion is formed so as to extend along the end portion of the flap main body, a wing-tip vortex generated at the end portion of the flap main body can be weakened over the chord direction of the flap main body.

On the other hand, because the length of the protruding portion at the end portions on the leading edge side and the trailing edge side is shorter in the span direction of the flap main body than substantially at the center thereof, an increase in aerodynamic drag can be prevented as compared with the case in which the length in the span direction is substantially fixed.

In the above-described first aspect, it is desirable that the protruding portion be formed so as to extend along an end portion of the flap main body, and the length of the protruding portion in the span direction of the flap main body be substantially fixed.

By doing so, because the protruding portion is formed so as to extend along the end portion of the flap main body, a wing-tip vortex generated at the end portion of the flap main body can be weakened over the chord direction of the flap main body.

With this configuration, because the length of the protruding portion in the span direction is substantially fixed, a wing-tip vortex generated at the end portion of the flap main body can be more reliably weakened over the chord direction of the flap main body as compared with the protruding portion whose length in the span direction is short at the end portion at the leading edge and the end portion at the trailing edge.

With the above-described first aspect, the configuration thereof may be such that the protruding portion is formed to protrude from the flap main body in the span direction of the flap main body.

In the above-described configuration, it is preferable that the length of the protruding portion in the span direction of the flap main body be in a range from 0.1 to 0.25 times the chord length of the flap main body and the length thereof in the chord direction of the flap main body be in a range from 0.44 to 0.95 times the length.

By doing so, the wing-tip vortex generated at the end portion of the flap main body can be weakened and an increase in the aerodynamic drag can be prevented by setting the length of the protruding portion in the span direction and the length thereof in the chord direction in the above-described ranges.

A wing according to a second aspect of the present invention is provided with a main wing; and a high-lift-device of the above-described present invention that is disposed so as to be extendable/retractable relative to a trailing edge of the main wing.

With the above-described second aspect, because the wing of the present invention described above is provided, when the flap main body is extended from the main wing, the wing-tip vortex generated at the end portion of the flap main body can be weakened and, furthermore, the wing-tip vortex can be moved away from the surface of the flap main body.

On the other hand, there is little possibility that retracting/extending of the flap main body will be adversely affected. Furthermore, the aerodynamics characteristic at the wing can be prevented from deteriorating.

A noise reduction device for a high-lift-device according to a third aspect of the present invention is provided with an attaching/detaching main body that is attached to/detached from an end portion of a flap main body, which is disposed so as to be extendable/retractable relative to a main wing; and a protruding portion that smoothly protrudes from a surface of the attaching/detaching main body on the positive-pressure surface side of the flap main body in a direction away from the attaching/detaching main body.

With the third aspect of the present invention described above, when the flap main body to which the noise reduction device of the present invention is attached is extended from the main wing, the wing-tip vortex generated at the end portion of the flap main body can be weakened and, furthermore, the wing-tip vortex can be moved away from the surface of the flap main body.

On the other hand, there is little possibility that retracting/extending of the flap main body is adversely affected. Furthermore, the aerodynamics characteristic at the wing can be prevented from deteriorating.

Because the attaching/detaching main body is attachable/detachable to the flap main body, as opposed to a conventional high-lift-device that is not provided with the noise reduction device of the present invention, the noise reduction device of the present invention can be retrofitted.

Advantageous Effects of Invention

With the high-lift-device, the wing, and the noise reduction device for a high-lift-device according to the present invention, an advantage is afforded in that noise generated when a flap is extended can be reduced by weakening a wing-tip vortex generated at an end of a flap main body when the flap main body is extended from a main wing and by, additionally, moving the wing-tip vortex away from a surface of the flap main body.

An advantage is afforded in that an increase in weight can be prevented, because a protruding portion is a fixed member, which smoothly protrudes from a positive-pressure surface of the flap main body, requiring no driving mechanism.

An advantage is afforded in that deterioration of aerodynamics characteristic can be prevented when the flap is retracted, because the protruding portion is formed smoothly, in other words, in a smooth streamlined shape.

BRIEF DESCRIPTION OF DRAWINGS

FIG. 12 is a schematic view of the flap device in FIG. 10 viewed from a positive-pressure surface side.

FIG. 13 is a cross-sectional view for explaining the configuration of a protruding portion in a flap device of a wing according to a third modification of the first embodiment of the present invention.

FIG. 14 is a schematic view of the flap device in FIG. 13 viewed from a leading-edge side.

DESCRIPTION OF EMBODIMENTS

{First Embodiment}

A wing according to a first embodiment of the present invention will be described with reference to FIGS. 1 to 6.

In this embodiment, a high-lift-device and the wing of the present invention will be described as applied to a flap device and a wing of an aircraft.

Figure 1:
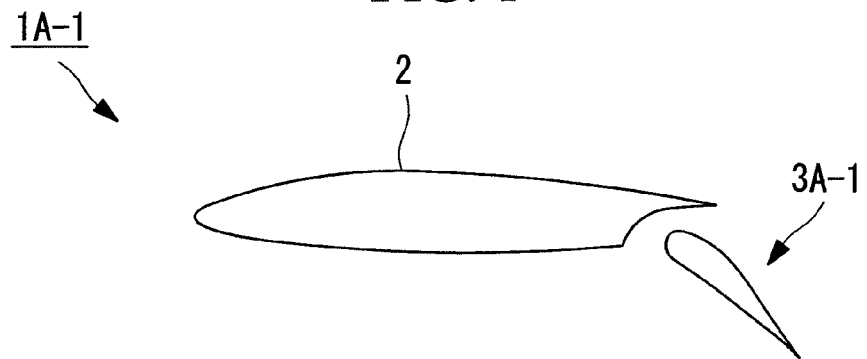
FIG. 1 is a schematic view for explaining, in outline, a wing according to a first embodiment of the present invention and is a diagram for explaining a state in which a flap is extended from a main wing.

FIG. 1 is a schematic view for explaining, in outline, the wing according to this embodiment and is a diagram for explaining a state in which a flap is extended from a main wing.

As shown in FIG. 1, a wing 1A-1 is provided with a main wing 2 and a flap device (high-lift-device) 3A-1.

The main wing 2 is a member that constitutes the wing 1A-1 together with the flap device 3A-1 and is formed to have such an airfoil shape that realizes the required aerodynamics characteristic for the wing 1A-1 when the flap device 3A-1 is retracted and for the paired main wing 2 and flap device 3A-1 when the flap device 3A-1 is extended.

The flap device 3A-1 is disposed at a trailing edge of the main wing 2, and a drive mechanism (not shown) that retracts and extends the flap device 3A-1 is provided inside the main wing 2.

Note that another high-lift-device, such as a slat or the like, may be disposed at a leading edge of the main wing 2, or the wing 1A-1 may be formed only of the main wing 2 and the flap device 3A-1; it is not particularly limited.

Figure 2:
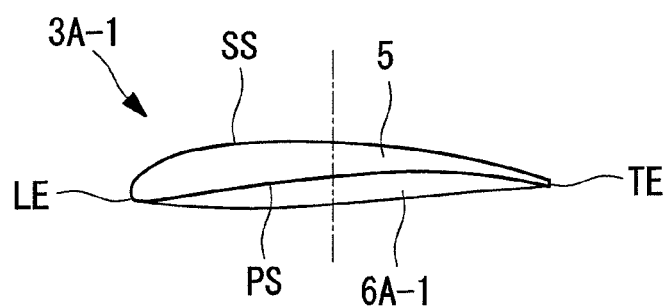
FIG. 2 is a cross-sectional view for explaining the configuration of a protruding portion in a flap device in FIG. 1.
Figure 3:
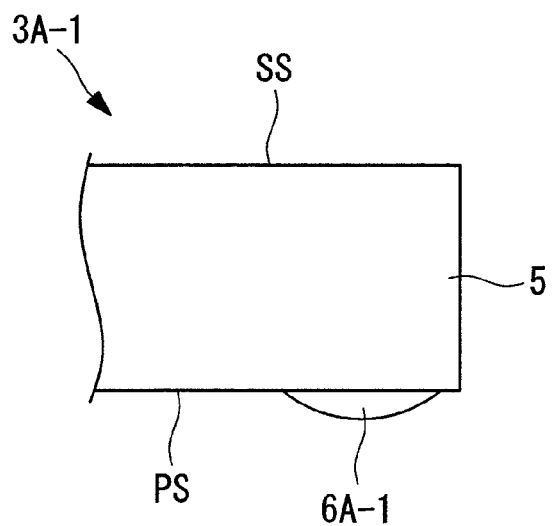
FIG. 3 is a schematic view of the flap device in FIG. 1 viewed from a leading-edge side.
Figure 4:
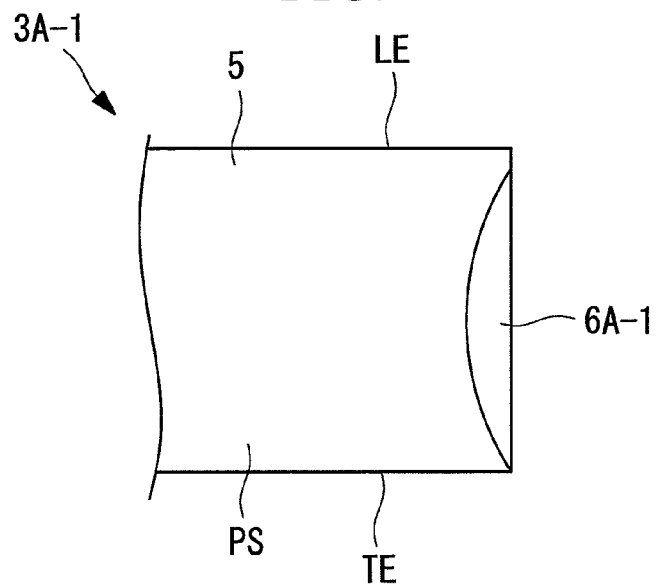
FIG. 4 is a schematic view of the flap device in FIG. 1 viewed from a positive-pressure surface side.

FIG. 2 is a cross-sectional view for explaining the configuration of a protruding portion in the flap device. FIG. 3 is a schematic view of the flap device in FIG. 1 viewed from a leading-edge side. FIG. 4 is a schematic view of the flap device in FIG. 1 viewed from a positive-pressure surface side.

The flap device 3A-1 is an device that increases the lift generated at the wing 1A-1 and it is employed, for example, during take-off/landing of an aircraft provided with the wing 1A-1.

As shown in FIGS. 2 to 4, the flap device 3A-1 is provided with a flap main body 5 and a protruding portion 6A-1.

Note that, in this embodiment, the flap device 3A-1 will be described as applied to a slotted flap, etc. provided with one flap main body 5; however, application to other types of flap is also possible, and it is not particularly limited.

As shown in FIG. 1, the flap main body 5 constitutes part of the trailing edge of the main wing 2 and is disposed so that it can be folded toward a concavely curved positive-pressure surface of the main wing 2.

As with the wing 1A-1, a leading edge LE, which is an upstream-side end portion, a trailing edge TE, which is a downstream-side end portion, a positive-pressure surface PS, which is concavely curved, and a negative-pressure surface SS, which is convexly curved, are formed in the flap main body 5.

As shown in FIGS. 2 to 4, the protruding portion 6A-1 protrudes at an end portion of the positive-pressure surface PS in the flap main body 5, with a smooth streamlined shape, in a direction away from the flap main body 5 (downward in FIGS. 2 and 3).

This embodiment will be described as applied to an example in which one flap device 3A-1 is provided at each of the left and right wings 1A-1 provided in an aircraft, and the protruding portions 6A-1 are provided at the end portions of the flap main bodies 5 at the wing-tip sides of the wings 1A-1.

Note that at a portion closer to a fuselage of the aircraft than the above-described flap device 3A-1 in the wing 1A-1, at least one flap main body 5 without the protruding portion 6A-1 may be disposed side-by-side with narrow gaps therebetween; it is not particularly limited.

Here, the narrow gaps are gaps that can prevent the occurrence of a wing-tip vortex that causes aerodynamic noise at the end portion of the flap main body 5.

On the other hand, the protruding portion 6A-1 may additionally be provided at an end portion of the flap main body 5 on the fuselage side of the aircraft; it is not particularly limited. In this case, a plurality of flap devices 3A-1 may be disposed side-by-side with predetermined gaps therebetween, and it is not particularly limited.

Here, unlike the above-described narrow gaps, the predetermined gaps are gaps where the wing-tip vortex may be generated which causes the aerodynamic noise at the end portion of the flap main body 5.

As shown in FIG. 2, the protruding portion 6A-1 is formed so that the amount of protrusion from the flap main body 5 smoothly increases from the leading edge LE side of the flap main body 5 toward substantially the center thereof, and so that the amount of protrusion from the flap main body 5 smoothly decreases from substantially the center toward the trailing edge TE.

On the other hand, as shown in FIG. 3, the protruding portion 6A-1 is formed so that the amount of protrusion from the flap main body 5 smoothly increases from the end portion of the flap main body 5 toward the center (leftward in FIG. 3), and so that the amount of protrusion smoothly decreases thereafter.

Furthermore, as shown in FIG. 4, the protruding portion 6A-1 is formed so that the width thereof, which is the length in the span direction (left-right direction in FIG. 4) of the flap main body 5, smoothly increases from the leading edge LE side of the flap main body 5 toward substantially the center thereof, and so that the width smoothly decreases from substantially the center toward the trailing edge TE. The end portion of the protruding portion 6A-1 on the wing-tip side (right side in FIG. 4) of the flap main body 5 is formed along the wing-tip of the flap main body 5.

In other words, the end portions on the leading edge LE side and the trailing edge TE side of the flap main body 5 are formed such that the length of the flap main body 5 in the span direction, that is, the width thereof, is shorter as compared with substantially the center of the protruding portion 6A-1.

Figure 5:
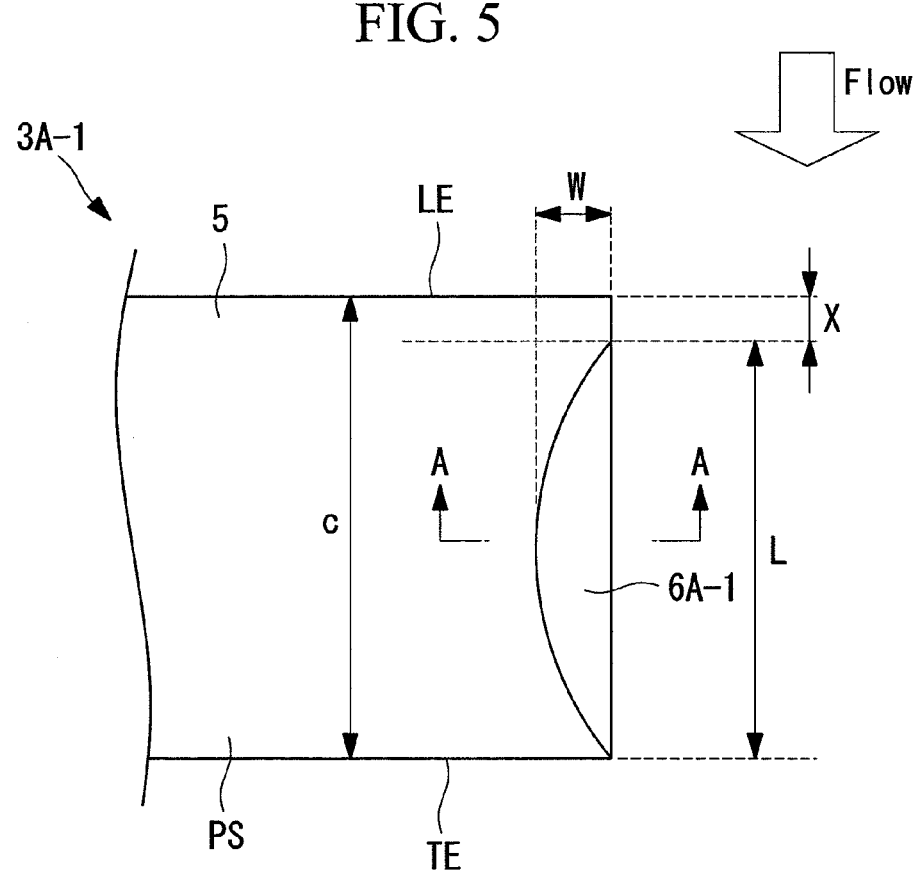
FIG. 5 is a diagram for explaining shape parameters of the protruding portion in FIG. 2.
Figure 6:
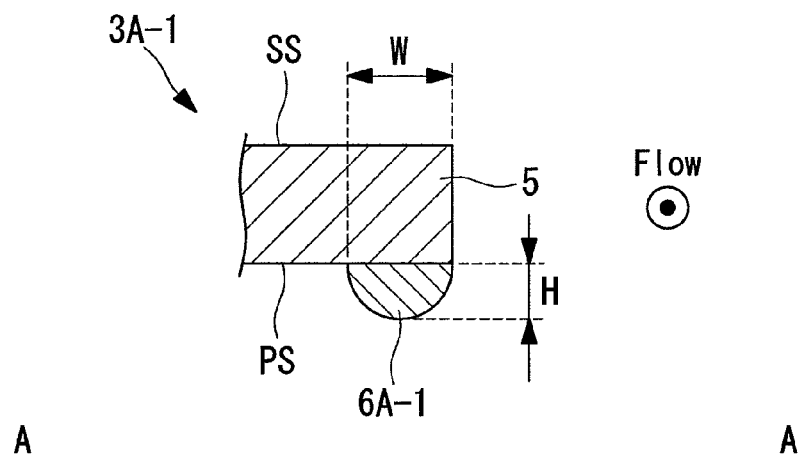
FIG. 6 is a cross-sectional view taken along A-A for explaining shape parameters of the protruding portion in FIG. 5.

FIG. 5 is a diagram for explaining shape parameters of the protruding portion in FIG. 2. FIG. 6 is a cross-sectional view taken along A-A for explaining shape parameters of the protruding portion in FIG. 5.

As shown in FIGS. 5 and 6, the parameters for explaining the shape of the protruding portion 6A-1 include a width W, a height H, a chord-direction length L, and a leading-edge attachment position X. As shown in FIG. 6, the protruding portion 6A-1 is formed to have a semicircular cross-section.

This embodiment will be described as applied to an example in which, defining the chord length, which is the length of a straight line connecting the leading edge LE and the trailing edge TE of the flap main body 5, as c, the width W is 0.20 c, the height H is 0.10 c, the chord-direction length L is 0.95 c, and the leading-edge attachment position X is 0.05 c for the protruding portion 6A-1.

Next, the effect of the wing 1A-1 having the above-described configuration will be described.

The flap main body 5 of the flap device 3A-1 in the wing 1A-1 is extended from the main wing 2 when takeoff, as shown in FIG. 1, and is retracted into the main body 2 so as to form a single airfoil shape when cruising.

Note that the degrees of extension of the flap main body 5 differ between when takeoff and when landing, and the extension of the flap main body 5 is greater when landing as compared with when takeoff. In this embodiment, the operation during landing when aerodynamic noise generated from the flap main body 5 becomes significant will mainly be described.

When an aircraft provided with the wing 1A-1 takes a landing position, the flap main body 5 is extended from the main wing 2, as shown in FIG. 1, in order to realize the aerodynamics characteristic required during landing.

Typical angles at which the flap main body 5 is extended, that is, the flap angles are, for example, 32.5°, 35°, and so on. Furthermore, typical angles of attack in the landing position are, for example, 6°, 10°, and so on.

When the flap main body 5 is extended from the main wing 2, air is divided between the convexly curved negative-pressure surface side and the concavely curved positive-pressure surface side of the main wing 2 and respectively flows along the negative-pressure surface and the positive-pressure side. The air that has flowed around the main wing 2 additionally flows along the negative-pressure surface SS and the positive-pressure surface PS of the flap main body 5.

Most of the air that flows along the negative-pressure surface SS and the positive-pressure surface PS of the flap main body 5 flows in the downstream direction from the trailing edge TE of the flap main body 5. On the other hand, of the air that flows along the positive-pressure surface PS of the flap main body 5, part of the air that flows near the end portion of the flap main body 5 flows around the end portion of the flap main body to the negative-pressure surface SS side due to the pressure difference between the negative-pressure surface SS and the positive-pressure surface PS of the flap main body 5.

This flow of air becomes a wing-tip vortex generated at the end portion of the flap main body 5.

Here, because the protruding portion 6A-1 is formed at the end portion of the flap main body 5, the air is diverted via the protruding portion 6A-1 and flows toward the negative-pressure surface SS side from the positive-pressure surface PS side by going around the end portion of the flap main body 5. In other words, the flow of air that flows toward the negative-pressure surface SS side from the positive-pressure surface PS side by going around the end portion of the flap main body 5 is interrupted.

With the above-described configuration, when the flap main body 5 is extended from the main wing 2, the wing-tip vortex generated at the end portion of the flap main body 5 can be weakened and, furthermore, the wing-tip vortex can be moved away from the surface of the flap main body 5.

That is, a wing-tip vortex is a flow of air toward the negative-pressure surface SS from the positive-pressure surface PS of the flap main body 5 at the end portion of the flap main body 5, and, by providing the protruding portion 6A-1, this flow of air can be weakened. Furthermore, because the above-described flow of air is diverted via the protruding portion 6A-1, the above-described flow of air can be guided to a position away from the surface of the flap main body 5. Accordingly, the flap device 3A-1 of this embodiment can significantly reduce aerodynamic noise.

Furthermore, because the protruding portion 6A-1 is formed so as to extend along the end portion of the flap main body 5, the wing-tip vortex generated at the end portion of the flap main body 5 can be weakened along the chord direction of the flap main body 5.

On the other hand, because the protruding portion 6A-1 is a fixed member that smoothly protrudes from the positive-pressure surface PS of the flap main body 5 and that requires no driving mechanism, as compared with other devices that require driving mechanisms, it is possible to reduce possible adverse effects on extending/retracting the flap main body 5.

Furthermore, in the state in which the flap main body 5 is retracted into the main wing 2, that is, in the state in which an aircraft provided with the flap device 3A-1 of this embodiment is cruising, the protruding portion 6A-1 protrudes from the main wing 2; however, because it is formed in a smooth streamlined shape, the aerodynamics characteristic of the flap device 3A-1 can be prevented from deteriorating.

Specifically, because the length of the protruding portion 6A-1 on the end portions at the leading edge LE side and the trailing edge TE side is shorter in the span direction of the flap main body 5 than substantially at the center thereof, an increase in aerodynamic drag can be prevented as compared with the case in which the length in the span direction is substantially fixed.

Note that results of aerodynamic noise measurement of a model of the wing 1A-1 provided with the flap device 3A-1 according to this embodiment will be described later along with other embodiments.

{First Modification of the First Embodiment}

Next, a first modification of the first embodiment of the present invention will be described with reference to FIGS. 7 to 9.

Although the basic configuration of a wing of this modification is similar to that of the first embodiment, it differs from the first embodiment with respect to the configuration of the flap device. Therefore, in this modification, only the flap device will be described using FIGS. 7 to 9, and descriptions of other configurations, etc. will be omitted.

Figure 7:
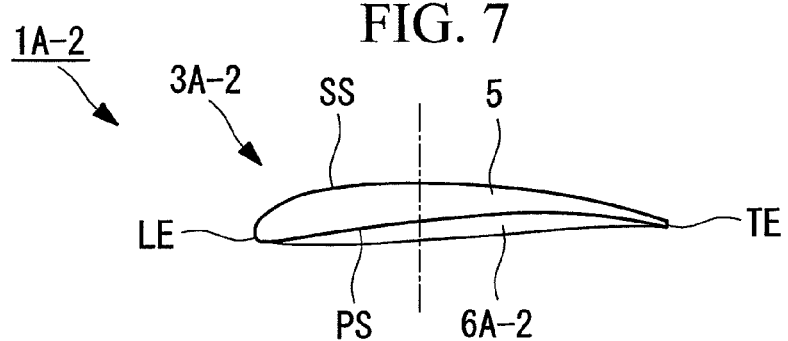
FIG. 7 is a cross-sectional view for explaining the configuration of a protruding portion in a flap device of a wing according to a first modification of the first embodiment of the present invention.

FIG. 7 is a cross-sectional view for explaining the configuration of a protruding portion in a flap device of a wing according to this modification. FIG. 8 is a schematic view of the flap device in FIG. 7 viewed from a leading-edge side. FIG. 9 is a schematic view of the flap device in FIG. 7 viewed from a positive-pressure surface side.

Note that components that are the same as those of the first embodiment are given the same reference signs, and descriptions thereof will be omitted.

Figure 8:
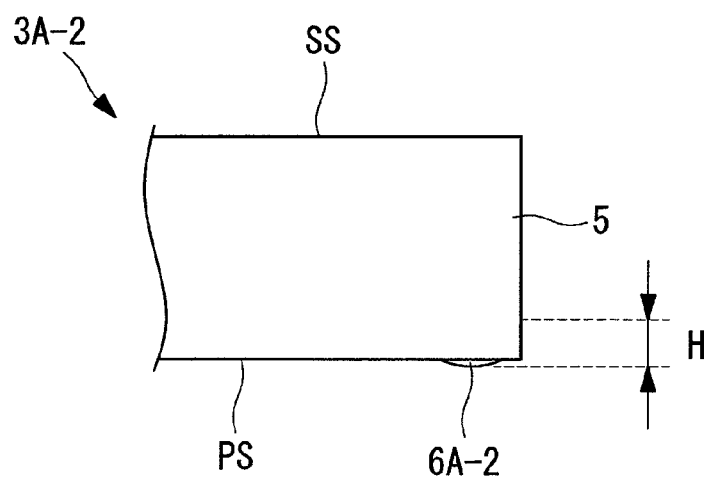
FIG. 8 is a schematic view of the flap device in FIG. 7 viewed from a leading-edge side.
Figure 9:
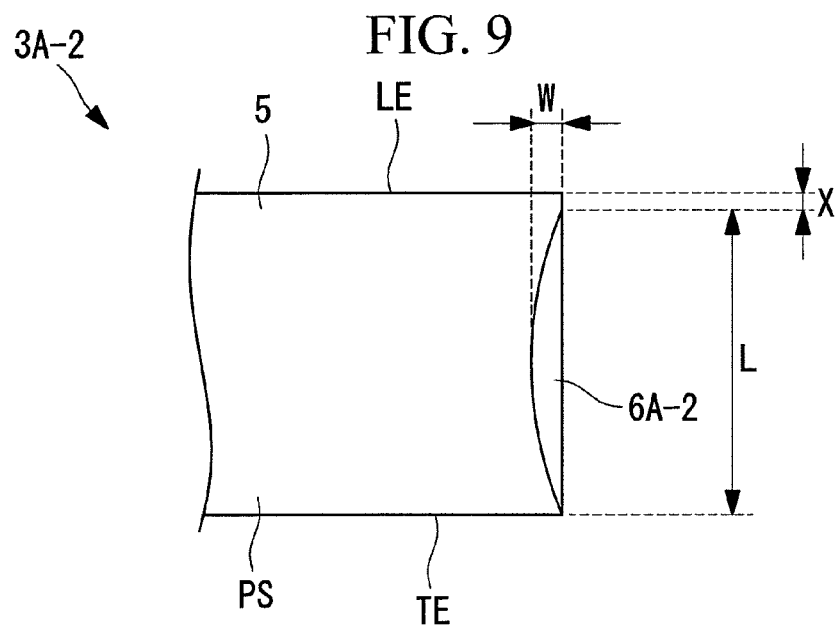
FIG. 9 is a schematic view of the flap device in FIG. 7 viewed from a positive-pressure surface side.

As shown in FIGS. 7 to 9, a flap device 3A-2 of a wing 1A-2 is provided with the flap main body 5 and a protruding portion 6A-2.

The protruding portion 6A-2 protrudes at an end portion of the positive-pressure surface PS in the flap main body 5, with a smooth streamlined shape, in a direction away from the flap main body 5 (downward in FIGS. 7 and 8).

The shape of the protruding portion 6A-2 is the same shape as the protruding portion 6A-1 of the first embodiment except that the width thereof is substantially half as long in the span direction.

Specifically, this modification will be described as applied to a case in which the width W of the protruding portion 6A-2 is 0.10 c, the height H is 0.05 c, the chord-direction length L is 0.95 c, and the leading-edge attachment position X is 0.05 c.

Because the effect of the wing 1A-2 having the above-described configuration is similar to the effect of the wing 1A-1 of the first embodiment, a description thereof will be omitted.

Note that results of aerodynamic noise measurement of a model of the wing 1A-2 provided with the flap device 3A-2 according to this modification will be described later along with other embodiments.

{Second Modification of the First Embodiment}

Next, a second modification of the first embodiment of the present invention will be described with reference to FIGS. 10 to 12.

Although the basic configuration of a wing of this modification is similar to that of the first embodiment, it differs from the first embodiment with respect to the configuration of the flap device. Therefore, in this modification, only the flap device will be described using FIGS. 10 to 12, and descriptions of other configurations, etc. will be omitted.

Figure 10:
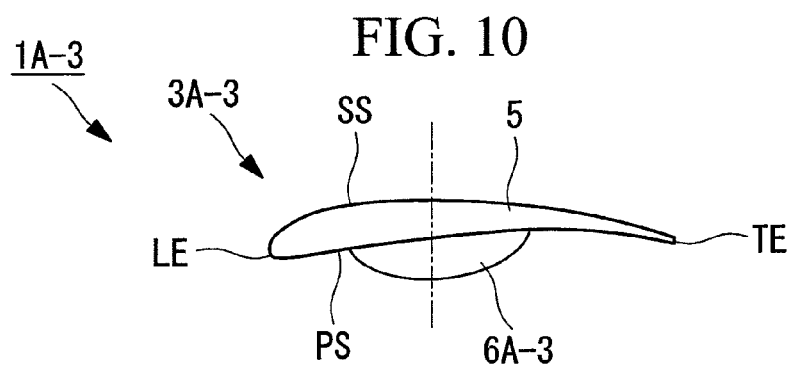
FIG. 10 is a cross-sectional view for explaining the configuration of a protruding portion in a flap device of a wing according to a second modification of the first embodiment of the present invention.

FIG. 10 is a cross-sectional view for explaining the configuration of a protruding portion in a flap device of a wing of this modification. FIG. 11 is a schematic view of the flap device in FIG. 10 viewed from a leading-edge side. FIG. 12 is a schematic view of the flap device in FIG. 10 viewed from a positive-pressure surface side.

Note that components that are the same as those of the first embodiment are given the same reference signs and descriptions thereof will be omitted.

Figure 11:
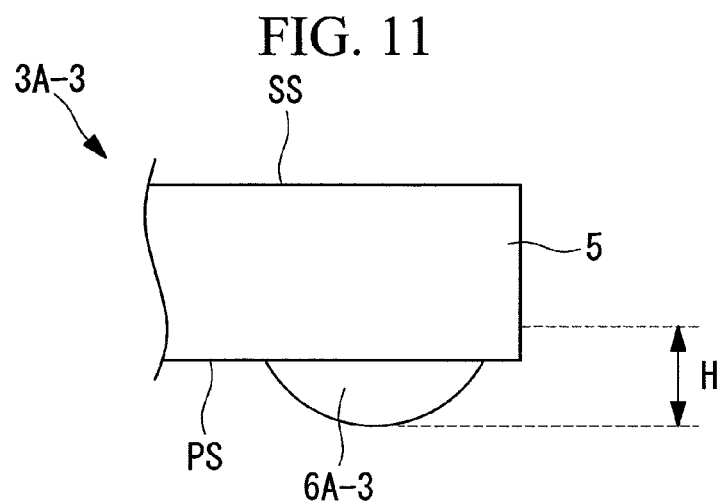
FIG. 11 is a schematic view of the flap device in FIG. 10 viewed from a leading-edge side.

As shown in FIGS. 10 to 12, a flap device 3A-3 of a wing 1A-3 is provided with the flap main body 5 and a protruding portion 6A-3.

The protruding portion 6A-3 protrudes at an end portion of the positive-pressure surface PS in the flap main body 5, with a smooth streamlined shape, in a direction away from the flap main body 5 (downward in FIGS. 10 and 12).

The shape of the protruding portion 6A-3 is the same shape as the protruding portion 6A-1 of the first embodiment except that the length thereof is substantially half as long in the chord direction and that the leading-edge attachment position is different.

Specifically, this modification will be described as applied to a case in which the width W of the protruding portion 6A-3 is 0.20 c, the height H is 0.10 c, the chord-direction length L is 0.44 c, and the leading-edge attachment position X is 0.20 c.

Because the effect of the wing 1A-3 having the above-described configuration is similar to the effect of the wing 1A-1 of the first embodiment, a description thereof will be omitted.

{Third Modification of the First Embodiment}

Next, a third modification of the first embodiment of the present invention will be described with reference to FIGS. 13 to 15.

Although the basic configuration of a wing of this modification is similar to that of the first embodiment, it differs from the first embodiment with respect to the configuration of the flap device. Therefore, in this modification, only the flap device will be described using FIGS. 13 to 15, and descriptions of other configurations, etc. will be omitted.

FIG. 13 is a cross-sectional view for explaining the configuration of a protruding portion in a flap device of a wing according to this modification. FIG. 14 is a schematic view of the flap device in FIG. 13 viewed from a leading-edge side. FIG. 15 is a schematic view of the flap device in FIG. 13 viewed from a positive-pressure surface side.

Note that components that are the same as those of the first embodiment are given the same reference signs and descriptions thereof will be omitted.

Figure 15:
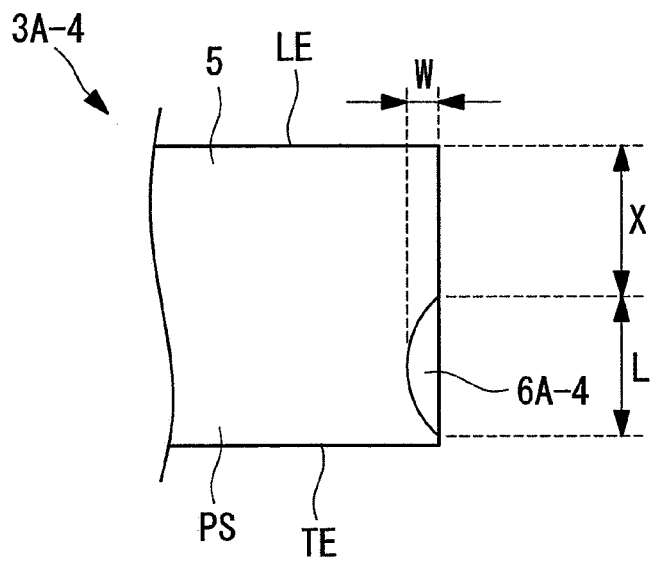
FIG. 15 is a schematic view of the flap device in FIG. 13 viewed from a positive-pressure surface side.

As shown in FIGS. 13 to 15, a flap device 3A-4 of a wing 1A-4 is provided with the flap main body 5 and a protruding portion 6A-4.

The protruding portion 6A-4 protrudes at an end portion of the positive-pressure surface PS in the flap main body 5, with a smooth streamlined shape, in a direction away from the flap main body 5 (downward in FIGS. 13 and 14).

The shape of the protruding portion 6A-4 is the same shape as the protruding portion 6A-1 of the first embodiment except that the width thereof in the span direction and length thereof in the chord direction are substantially half as long, and that the leading-edge attachment position is different.

Specifically, this modification will be described as applied to a case in which the width W of the protruding portion 6A-4 is 0.10 c, the height H is 0.05 c, the chord-direction length L is 0.48 c, and the leading-edge attachment position X is 0.50 c.

Because the effect of the wing 1A-4 having the above-described configuration is similar to the effect of the wing 1A-1 of the first embodiment, a description thereof will be omitted.

Note that results of aerodynamic noise measurement of a model of the wing 1A-4 provided with the flap device 3A-4 according to this embodiment will be described later along with other embodiments.

{Fourth Modification of the First Embodiment}

Next, a fourth modification of the first embodiment of the present invention will be described with reference to FIGS. 16 to 18.

Although the basic configuration of a wing of this modification is similar to that of the first embodiment, it differs from the first embodiment with respect to the configuration of the flap device. Therefore, in this modification, only the flap device will be described using FIGS. 16 to 18, and descriptions of other configurations, etc. will be omitted.

Figure 16:
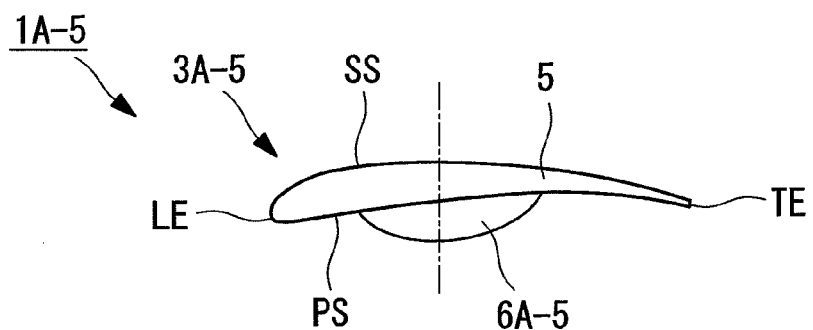
FIG. 16 is a cross-sectional view for explaining the configuration of a protruding portion in a flap device of a wing according to a fourth modification of the first embodiment of the present invention.

FIG. 16 is a cross-sectional view for explaining the configuration of a protruding portion in a flap device of a wing according to this modification. FIG. 17 is a schematic view of the flap device in FIG. 16 viewed from a leading-edge side. FIG. 18 is a schematic view of the flap device in FIG. 16 viewed from a positive-pressure surface side.

Note that components that are the same as those of the first embodiment are given the same reference signs and descriptions thereof will be omitted.

Figure 17:
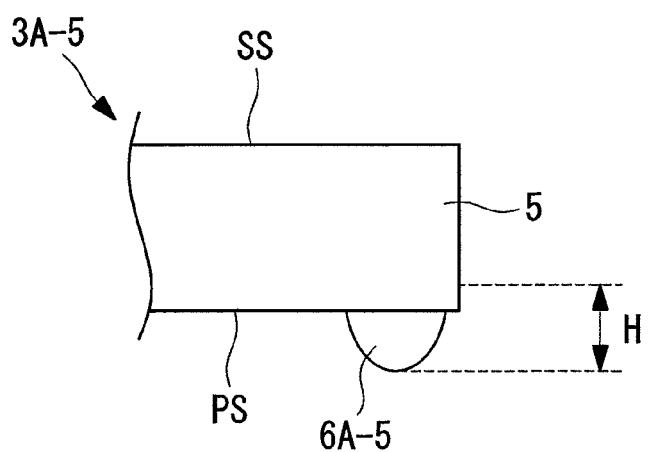
FIG. 17 is a schematic view of the flap device in FIG. 16 viewed from a leading-edge side.
Figure 18:
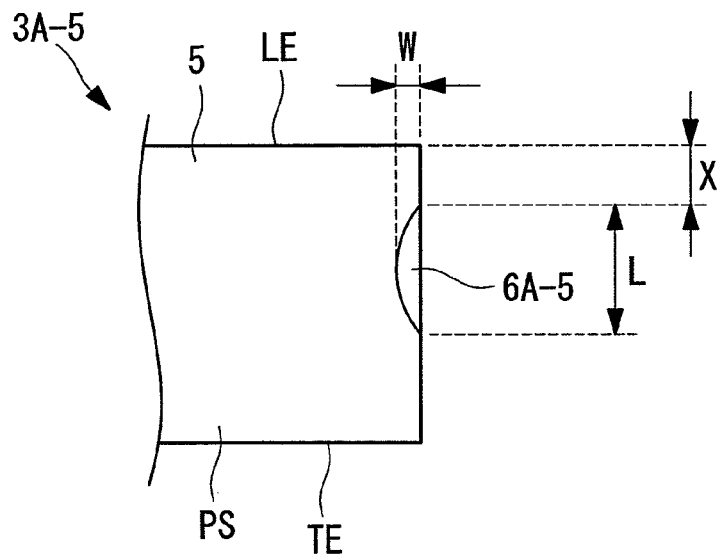
FIG. 18 is a schematic view of the flap device in FIG. 16 viewed from a positive-pressure surface side.

As shown in FIGS. 16 to 18, a flap device 3A-5 of a wing 1A-5 is provided with the flap main body 5 and a protruding portion 6A-5.

The protruding portion 6A-5 protrudes at an end portion of the positive-pressure surface PS in the flap main body 5, with a smooth streamlined shape, in a direction away from the flap main body 5 (downward in FIGS. 16 and 17).

The shape of the protruding portion 6A-5 is the same shape as the protruding portion 6A-1 of the first embodiment except that the width thereof in the span direction and length thereof in the chord direction are substantially half as long, that height thereof is increased, and that the leading-edge attachment position is different.

Specifically, this modification will be described as applied to a case in which the width W of the protruding portion 6A-5 is 0.10 c, the height H is 0.10 c, the chord-direction length L is 0.44 c, and the leading-edge attachment position X is 0.20 c.

Because the effect of the wing 1A-5 having the above-described configuration is similar to the effect of the wing 1A-1 of the first embodiment, a description thereof will be omitted.

{Second Embodiment}

Next, a second embodiment of the present invention will be described with reference to FIGS. 19 to 21.

Although the basic configuration of a wing of this embodiment is similar to that of the first embodiment, it differs from the first embodiment with respect to the configuration of the flap device. Therefore, in this embodiment, only the flap device will be described using FIGS. 19 to 21, and descriptions of other configurations, etc. will be omitted.

Figure 19:
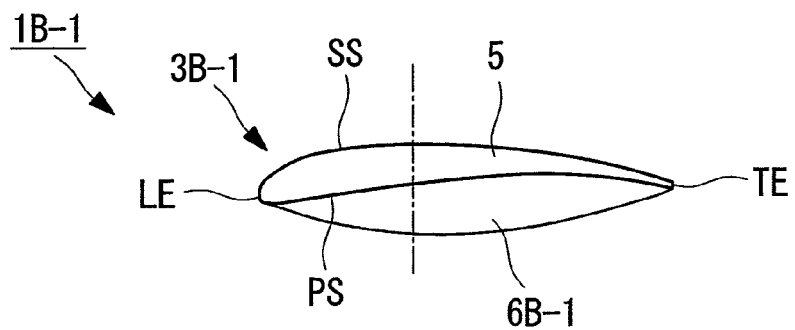
FIG. 19 is a cross-sectional view for explaining the configuration of a protruding portion in a flap device in a wing according a second embodiment of the present invention.

FIG. 19 is a cross-sectional view for explaining the configuration of a protruding portion in a flap device in a wing according to this embodiment. FIG. 20 is a schematic view of the flap device in FIG. 19 viewed from a leading-edge side. FIG. 21 is a schematic view of the flap device in FIG. 19 viewed from a positive-pressure surface side.

Note that components that are the same as those of the first embodiment are given the same reference signs and descriptions thereof will be omitted.

Figure 20:
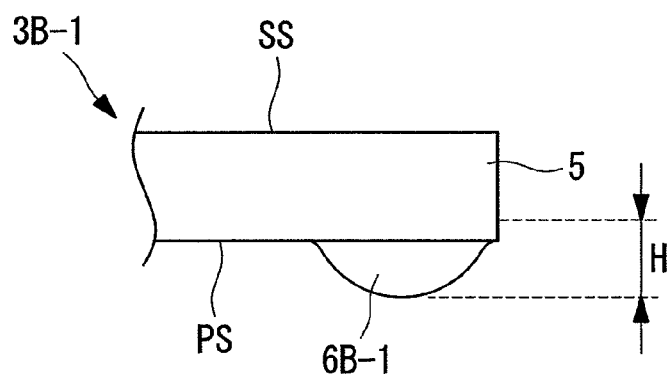
FIG. 20 is a schematic view of the flap device in FIG. 19 viewed from a leading-edge side.
Figure 21:
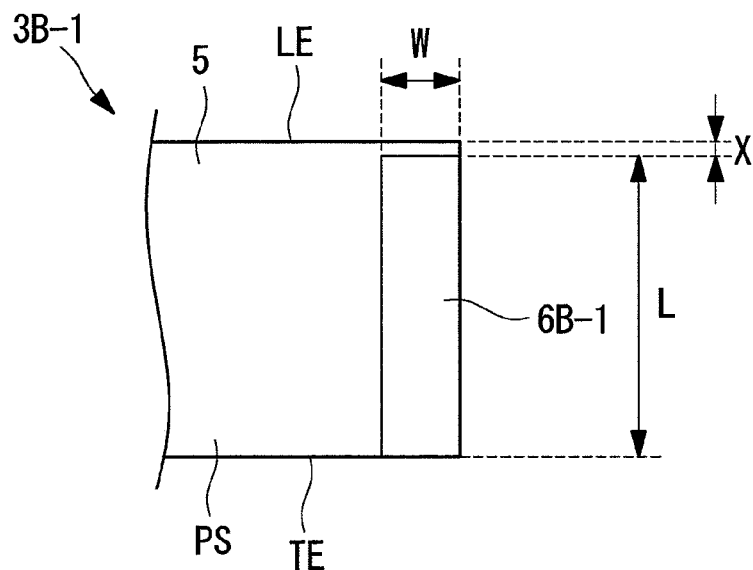
FIG. 21 is a schematic view of the flap device in FIG. 19 viewed from a positive-pressure surface side.

As shown in FIGS. 19 to 21, a flap device 3B-1 of a wing 1B-1 is provided with the flap main body 5 and a protruding portion 6B-1.

The protruding portion 6B-1 protrudes at an end portion of the positive-pressure surface PS in the flap main body 5, with a smooth streamlined shape, in a direction away from the flap main body 5 (downward in FIGS. 19 and 20).

As shown in FIG. 19, the protruding portion 6B-1 is formed so that the amount of protrusion from the flap main body 5 smoothly increases from the leading edge LE side of the flap main body 5 toward substantially the center thereof and so that the amount of protrusion from the flap main body 5 smoothly decreases from substantially the center toward the trailing edge TE.

On the other hand, as shown in FIG. 20, the protruding portion 6B-1 is formed so that the amount of protrusion from the flap main body 5 smoothly increases from the end portion of the flap main body 5 toward the center (leftward in FIG. 20) and so that the amount of protrusion smoothly decreases thereafter. In other words, the protruding portion 6B-1 is formed having a semicircular cross-section.

Furthermore, as shown in FIG. 21, the protruding portion 6B-1 is formed so that the width thereof, which is the length in the span direction (left-right direction in FIG. 21) of the flap main body 5, is fixed from the leading edge LE side of the flap main body 5 toward the trailing edge TE thereof. The end portion of the protruding portion 6B-1 on the wing-tip side (right side in FIG. 21) of the flap main body 5 is formed along the wing-tip of the flap main body 5.

Specifically, this embodiment will be described as applied to a case in which the width W of the protruding portion 6B-1 is 0.25 c, the height H is 0.13 c, the chord-direction length L is 0.95 c, and the leading-edge attachment position X is 0.50 c.

Because the effect of the wing 1B-1 having the above-described configuration is similar to the effect of the wing 1A-1 of the first embodiment, a description thereof will be omitted.

With this configuration, because the length of the protruding portion 6B-1 in the span direction is substantially fixed, a generated wing-tip vortex can be more reliably weakened over the chord direction of the flap main body 5 as compared with the protruding portion 6A-1 whose length in the span direction is short at the end portion at the leading edge LE and the end portion at the trailing edge TE, etc.

Note that results of aerodynamic noise measurement of a model of the wing 1B-1 provided with the flap device 3B-1 according to this embodiment will be described later along with other embodiments.

{First Modification of the Second Embodiment}

Next, a first modification of the second embodiment of the present invention will be described with reference to FIGS. 22 to 24.

Although the basic configuration of a wing of this modification is similar to that of the second embodiment, it differs from the second embodiment with respect to the configuration of the flap device. Therefore, in this modification, only the flap device will be described using FIGS. 22 to 24, and descriptions of other configurations, etc. will be omitted.

Figure 22:
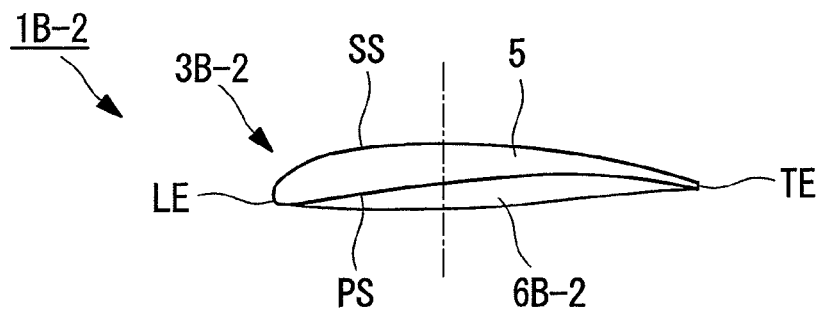
FIG. 22 is a cross-sectional view for explaining the configuration of a protruding portion in a flap device of a wing according to a first modification of the second embodiment of the present invention.

FIG. 22 is a cross-sectional view for explaining the configuration of a protruding portion in a flap device of a wing according to this modification. FIG. 23 is a schematic view of the flap device in FIG. 22 viewed from a leading-edge side. FIG. 24 is a schematic view of the flap device in FIG. 22 viewed from a positive-pressure surface side.

Note that components that are the same as those of the second embodiment are given the same reference signs and descriptions thereof will be omitted.

Figure 23:
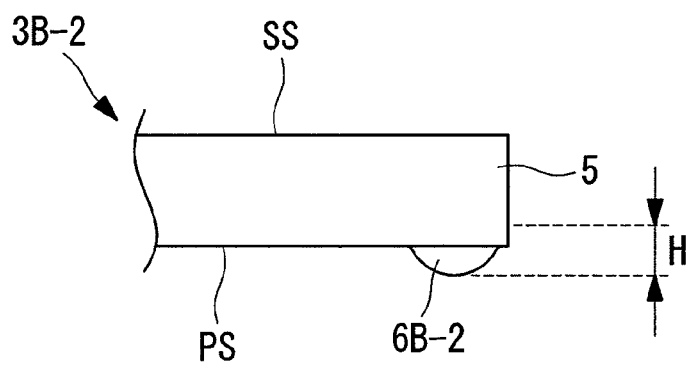
FIG. 23 is a schematic view of the flap device in FIG. 22 viewed from a leading-edge side.
Figure 24:
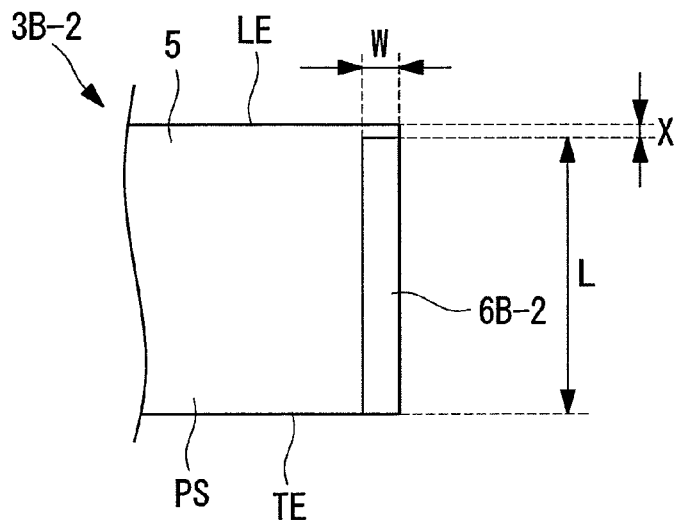
FIG. 24 is a schematic view of the flap device in FIG. 22 viewed from a positive-pressure surface side.

As shown in FIGS. 22 to 24, a flap device 3B-2 of a wing 1B-2 is provided with the flap main body 5 and a protruding portion 6B-2.

The protruding portion 6B-2 protrudes at an end portion of the positive-pressure surface PS in the flap main body 5, with a smooth streamlined shape, in a direction away from the flap main body 5 (downward in FIGS. 22 and 23).

The shape of the protruding portion 6B-2 is the same shape as the protruding portion 6B-1 of the first embodiment except that the width thereof is substantially half as long in the span direction.

Specifically, this modification will be described as applied to a case in which the width W of the protruding portion 6B-2 is 0.13 c, the height H is 0.07 c, the chord-direction length L is 0.95 c, and the leading-edge attachment position X is 0.05 c.

Because the effect of the wing 1B-2 having the above-described configuration is similar to the effect of the wing 1B-1 of the second embodiment, a description thereof will be omitted.

Note that results of aerodynamic noise measurement of a model of the wing 1B-2 provided with the flap device 3B-2 according to this modification will be described later along with other embodiments.

{Second Modification of the Second Embodiment}

Next, a second modification of the second embodiment of the present invention will be described with reference to FIGS. 15 to 27.

Although the basic configuration of a wing of this modification is similar to that of the second embodiment, it differs from the second embodiment with respect to the configuration of the flap device. Therefore, in this modification, only the flap device will be described using FIGS. 25 to 27, and descriptions of other configurations, etc. will be omitted.

Figure 25:
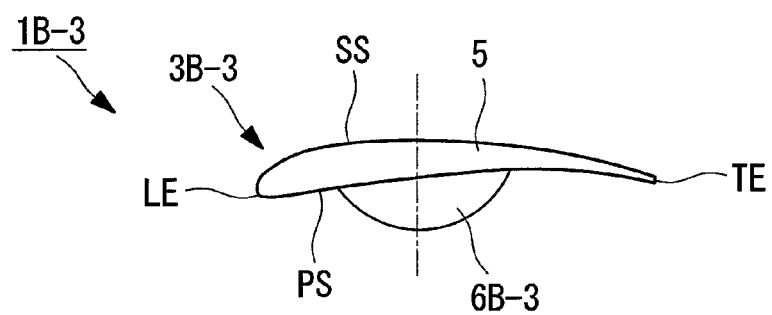
FIG. 25 is a cross-sectional view for explaining the configuration of a protruding portion in a flap device of a wing according to a second modification of the second embodiment of the present invention.
Figure 26:
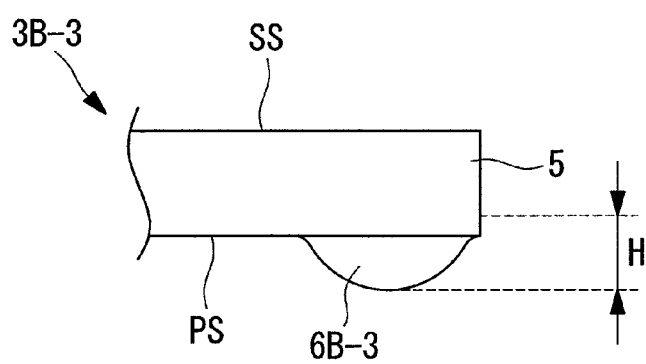
FIG. 26 is a schematic view of the flap device in FIG. 25 viewed from a leading-edge side.
Figure 27:
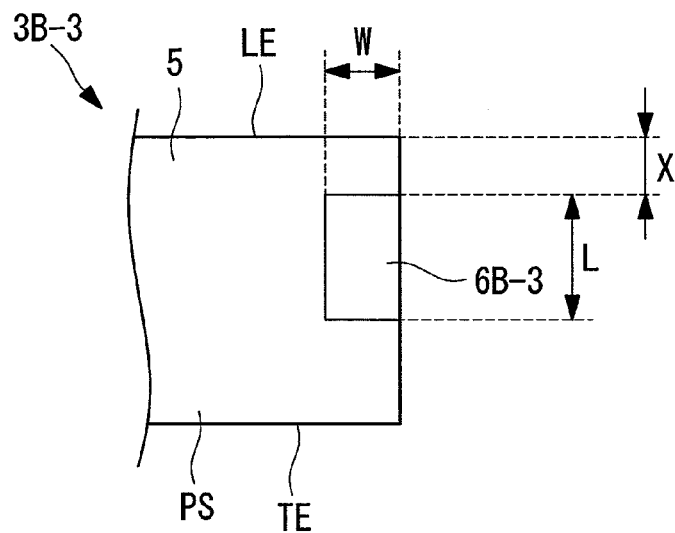
FIG. 27 is a schematic view of the flap device in FIG. 25 viewed from a positive-pressure surface side.

FIG. 25 is a cross-sectional view for explaining the configuration of a protruding portion in a flap device of a wing according to this modification. FIG. 26 is a schematic view of the flap device in FIG. 25 viewed from a leading-edge side. FIG. 27 is a schematic view of the flap device in FIG. 25 viewed from a positive-pressure surface side.

Note that components that are the same as those of the second embodiment are given the same reference signs and descriptions thereof will be omitted.

As shown in FIGS. 25 to 27, a flap device 3B-3 of a wing 1B-3 is provided with the flap main body 5 and a protruding portion 6B-3.

The protruding portion 6B-3 protrudes at an end portion of the positive-pressure surface PS in the flap main body 5, with a smooth streamlined shape, in a direction away from the flap main body 5 (downward in FIGS. 25 and 26).

The shape of the protruding portion 6B-3 is the same shape as the protruding portion 6B-1 of the second embodiment except that the length thereof is substantially half as long in the chord direction and that the leading-edge attachment position is different.

Specifically, this modification will be described as applied to a case in which the width W of the protruding portion 6B-3 is 0.25 c, the height H is 0.13 c, the chord-direction length L is 0.44 c, and the leading-edge attachment position X is 0.20 c.

Because the effect of the wing 1B-3 having the above-described configuration is similar to the effect of the wing 1B-1 of the second embodiment, a description thereof will be omitted.

{Third Modification of the Second Embodiment}

Next, a third modification of the second embodiment of the present invention will be described with reference to FIGS. 28 to 30.

Although the basic configuration of a wing of this modification is similar to that of the second embodiment, it differs from the second embodiment with respect to the configuration of the flap device. Therefore, in this modification, only the flap device will be described using FIGS. 28 to 30, and descriptions of other configurations, etc. will be omitted.

Figure 28:
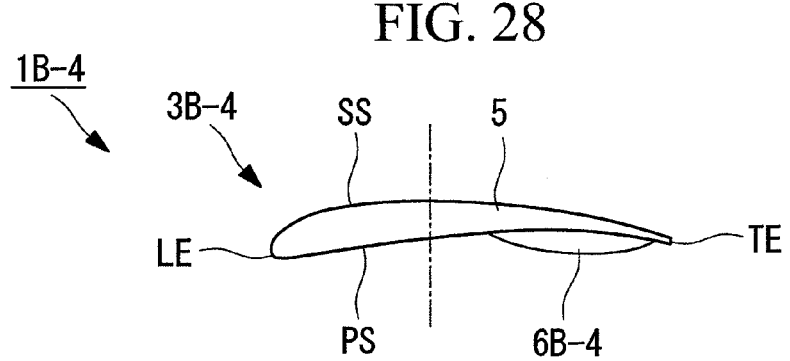
FIG. 28 is a cross-sectional view for explaining the configuration of a protruding portion in a flap device of a wing according to a third modification of the second embodiment of the present invention.

FIG. 28 is a cross-sectional view for explaining the configuration of a protruding portion in a flap device of a wing according to this modification. FIG. 29 is a schematic view of the flap device in FIG. 28 viewed from a leading-edge side. FIG. 30 is a schematic view of the flap device in FIG. 28 viewed from a positive-pressure surface side.

Note that components that are the same as those of the second embodiment are given the same reference signs and descriptions thereof will be omitted.

Figure 29:
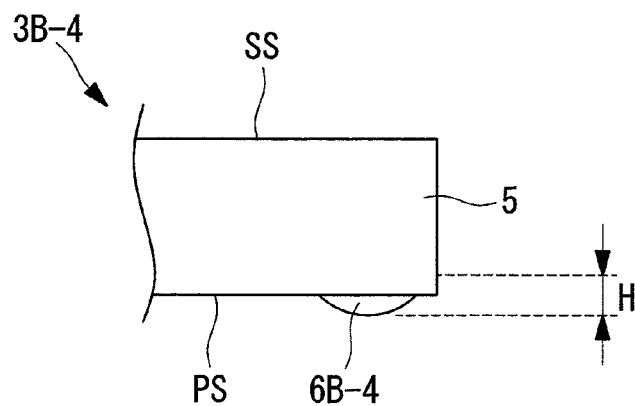
FIG. 29 is a schematic view of the flap device in FIG. 28 viewed from a leading-edge side.
Figure 30:
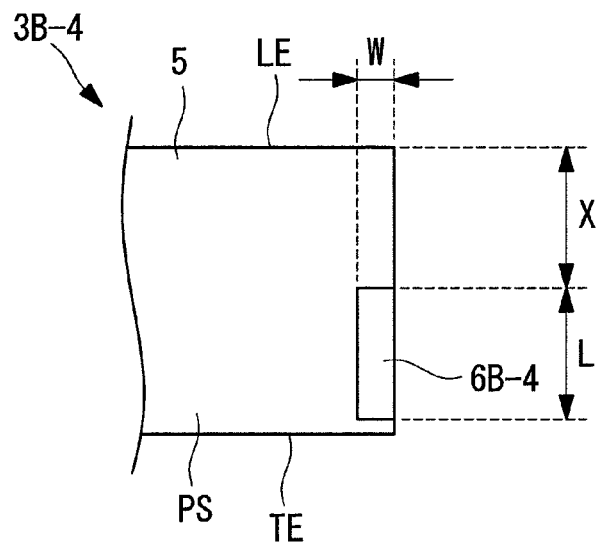
FIG. 30 is a schematic view of the flap device in FIG. 28 viewed from a positive-pressure surface side.

As shown in FIGS. 28 to 30, a flap device 3B-4 of a wing 1B-4 is provided with the flap main body 5 and a protruding portion 6B-4.

The protruding portion 6B-4 protrudes at an end portion of the positive-pressure surface PS in the flap main body 5, with a smooth streamlined shape, in a direction away from the flap main body 5 (downward in FIGS. 28 and 29).

The shape of the protruding portion 6B-4 is the same shape as the protruding portion 6B-1 of the second embodiment except that the width there of in the span direction and the length thereof in the chord direction are substantially half as long, and that the leading-edge attachment position is different.

Specifically, this modification will be described as applied to a case in which the width W of the protruding portion 6B-4 is 0.13 c, the height H is 0.07 c, the chord-direction length L is 0.48 c, and the leading-edge attachment position X is 0.50 c.

Because the effect of the wing 1B-4 having the above-described configuration is similar to the effect of the wing 1B-1 of the second embodiment, a description thereof will be omitted.

Note that results of aerodynamic noise measurement of a model of the wing 1B-4 provided with the flap device 3B-4 according to this modification will be described later along with other embodiments.

{Fourth Modification of the Second Embodiment}

Next, a fourth modification of the second embodiment of the present invention will be described with reference to FIGS. 31 to 33.

Although the basic configuration of a wing of this modification is similar to that of the second embodiment, it differs from the second embodiment with respect to the configuration of the flap device. Therefore, in this modification, only the flap device will be described using FIGS. 31 to 33, and descriptions of other configurations, etc. will be omitted.

Figure 31:
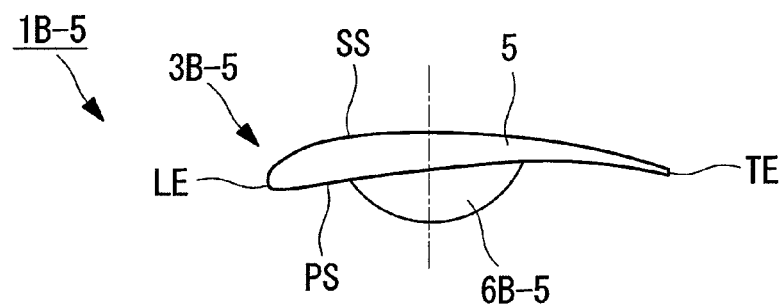
FIG. 31 is a cross-sectional view for explaining the configuration of a protruding portion in a flap device of a wing according to a fourth modification of the second embodiment of the present invention.

FIG. 31 is a cross-sectional view for explaining the configuration of a protruding portion in a flap device of a wing according to a fourth modification. FIG. 32 is a schematic view of the flap device in FIG. 31 viewed from a leading-edge side. FIG. 33 is a schematic view of the flap device in FIG. 31 viewed from a positive-pressure surface side.

Note that components that are the same as those of the second embodiment are given the same reference signs and descriptions thereof will be omitted.

Figure 32:
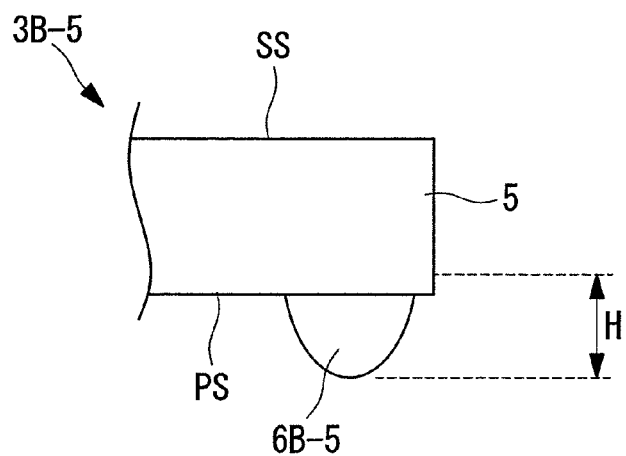
FIG. 32 is a schematic view of the flap device in FIG. 31 viewed from a leading-edge side.
Figure 33:
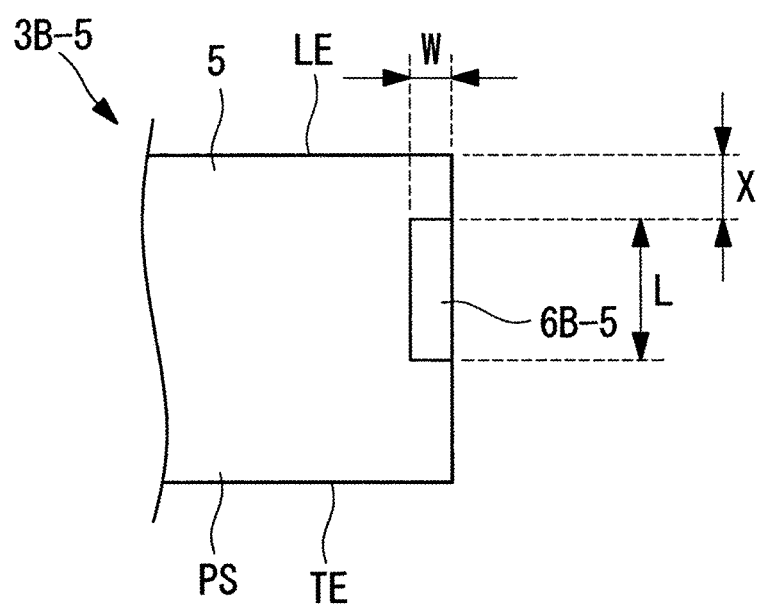
FIG. 33 is a schematic view of the flap device in FIG. 31 viewed from a positive-pressure surface side.

As shown in FIGS. 31 to 33, a flap device 3B-5 of a wing 1B-5 is provided with the flap main body 5 and a protruding portion 6B-5.

The protruding portion 6B-5 protrudes at an end portion of the positive-pressure surface PS in the flap main body 5, with a smooth streamlined shape, in a direction away from the flap main body 5 (downward in FIGS. 31 and 32).

The shape of the protruding portion 6B-5 is the same shape as the protruding portion 6B-1 of the second embodiment except that the width thereof in the span direction and the length thereof in the chord direction are substantially half as long, and that the leading-edge attachment position is different.

Specifically, this modification will be described as applied to a case in which the width W of the protruding portion 6B-5 is 0.13 c, the height H is 0.13 c, the chord-direction length L is 0.44 c, and the leading-edge attachment position X is 0.20 c.

Because the effect of the wing 1B-5 having the above-described configuration is similar to the effect of the wing 1B-1 of the second embodiment, a description thereof will be omitted.

Next, results of aerodynamic noise measurement using an aircraft model provided with the above-described wing 1A-1 or 1B-1 will be described.

Figure 34:
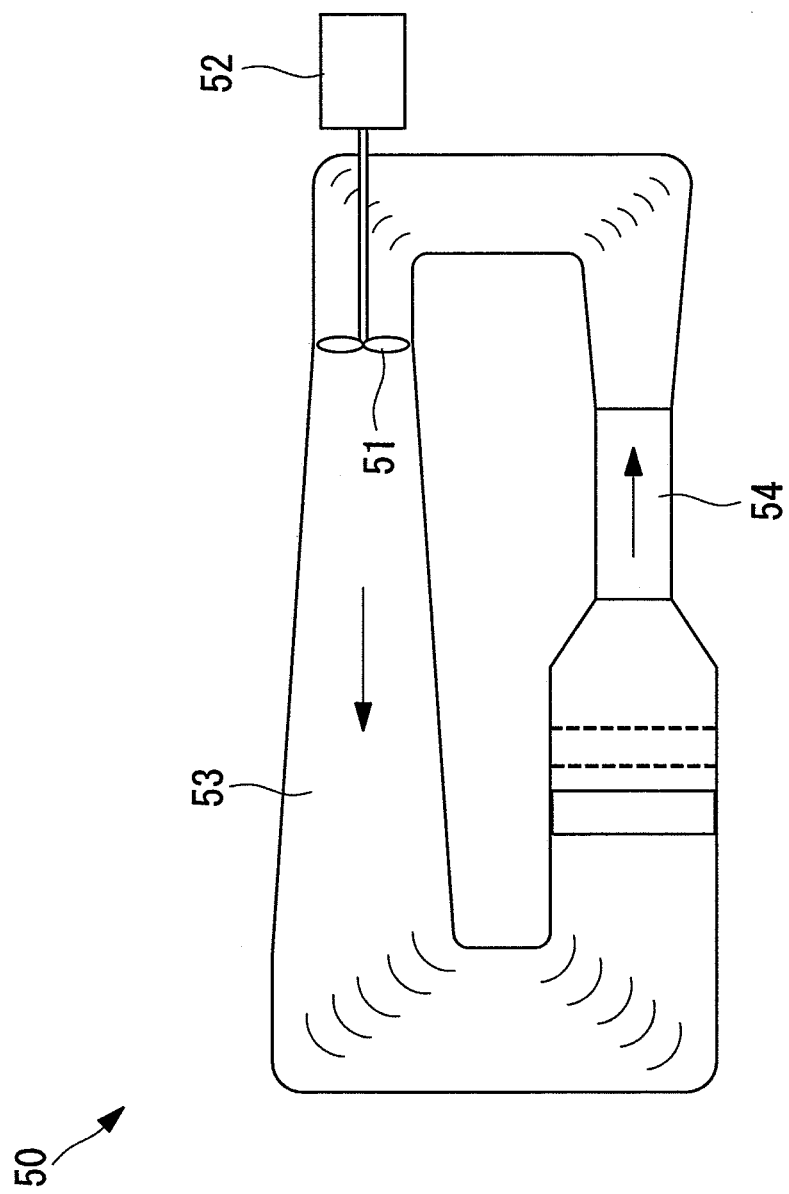
FIG. 34 is a schematic view for explaining the configuration of a wind tunnel employed for aerodynamic noise measurement.

FIG. 34 is a schematic view for explaining the configuration of a wind tunnel employed for aerodynamic noise measurement.

As shown in FIG. 34, a Closed-circuit wind tunnel 50 is employed for the aerodynamic noise measurement described here.

The wind tunnel 50 is provided with a fan 51, such as a propeller, etc., that blows out air, an electrical motor 52 that drives the fan 51, a wind path 53 where the air flows, a measurement portion 54 in which an aircraft model, which is the measurement subject, is disposed and measurement of noise, etc. is performed.

For this embodiment the aerodynamic noise measurement was performed using a low-speed wind tunnel at the Wind Tunnel Technology Center at the Aerospace Research and Development Directorate of the Japan Aerospace Exploration Agency.

Furthermore, the aircraft model employed for the aerodynamic noise measurement is a model of an actual aircraft shrunk to about 10% in size, that is planned to be or may be provided with the wing 1A-1 or 1B-1 and is formed in a landing configuration where the aerodynamic noise becomes the largest.

Specifically, it is assumed that front landing gear and main landing gear, which constitute the landing device, are activated, that is, in a state in which they are protruding from the fuselage of the aircraft and in which the angle of attack relative to a flow of air is 6°, which is the angle at the time of landing.

On the other hand, the wings 1A-1 and 1B-1 for the aircraft model are set in a state in which the angle of the flap main body 5, that is, the angle at which the flap main body 5 is extended from the main wing 2, is 32.5° and slats disposed at the leading edges of the wings 1A-1 and 1B-1 are extended.

In the measurement portion 54, an array of microphones that can measure aerodynamic noise emitted from the aircraft model and that is capable of localizing noise sources is provided. That is, an array of microphones that can measure portions where the aerodynamic noise is generated is provided.

The array of microphones is disposed at bottom surface side of the aircraft model, that is, the side at which the flap device 3A-1 or 3B-1 of the wing 1A-1 or 1B-1 is provided. With such an arrangement, sound-source identification can be performed at the bottom surface side of the aircraft model.

On the other hand, the fan 51 and the electric motor 52 form a flow of air in the measurement portion 54 corresponding to the speed of the above-described aircraft during landing. Here, a case in which the aerodynamic noise measurement is performed by setting the wind speed at 50 m/s will be described.

By performing the aerodynamic noise measurement under the above-described conditions using the aircraft models provided with the wings 1A-1 and 1B-1, noise reduction of 3 dB to 4 dB was confirmed for both cases as compared with a conventional wing that is not provided with the flap device 3A-1 or the like.

Furthermore, as a result of the sound-source identification, in contrast to the conventional wing that is not provided with the flap device 3A-1 or the like, wherein aerodynamic noise due to a wing-tip vortex is generated at the wing-tip side of the flap main body, that is, an outer end-portion thereof, it was confirmed that the occurrence of aerodynamic noise due to the wing-tip vortex described above was suppressed with the wings 1A-1 and 1B-1.

Next, results of aerodynamic noise measurement using a model of the wing 1A-1, 1A-2, 1A-4, 1B-1, 1B-2, or 1B-4 provided with the above-described flap device 3A-1, 3A-2, 3A-4, 3B-1, 3B-2 or 3B-4 will be described.

Figure 35:
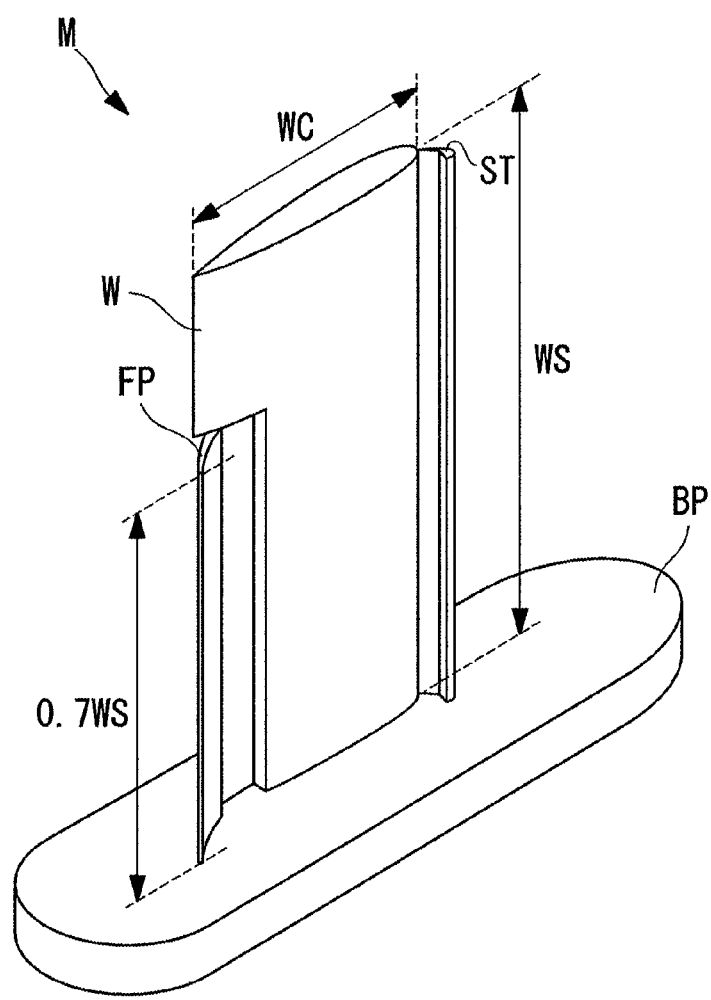
FIG. 35 is a diagram for explaining, in outline, the configuration of a wing model.

FIG. 35 is a diagram for explaining, in outline, the configuration of a wing model.

As shown in FIG. 35, a wing model M employed in the aerodynamic noise measurement has a shape where a wing W extends from a fuselage portion BP. The wing W is provided with a slat ST at a leading edge side and a flap device FP at a trailing edge side.

Therefore, when performing the aerodynamic noise measurement for any wing 1A-1, 1A-2, 1A-4, 1B-1, 1B-2, or 1B-4 provided with the flap device 3A-1, 3A-2, 3A-4, 3B-1, 3B-2, or 3B-4, the above-described flap device FP is exchanged with any flap device 3A-1, 3A-2, 3A-4, 3B-1, 3B-2, or 3B-4 or any flap device 3A-1, 3A-2, 3A-4, 3B-1, 3B-2, or 3B-4 is constituted by the above-described flap device FP and an attachment, etc., attached thereto.

Regarding the specific size of the wing model M, a length WS in the span direction of the wing W is about 1.265 m, and a length WC in the chord direction is about 0.6 m. The slat ST is disposed at the leading edge of the wing W over the entire length ST in the span direction. The flap device FP is disposed at the trailing edge of the wing W on a fuselage portion BP side, and the length thereof in the span direction is about 0.7 times the length of the length WC in the span direction of the wing W.

Furthermore, to measure the aerodynamic noise in the landing form, the form thereof is set such that the slat ST is extended at 25° and the flap device FP is extended at 35°, and the model is placed so that the angle of attack is about 10°.

On the other hand, as in the case of the aircraft model, the Closed-circuit wind tunnel 50 is used for the aerodynamic noise measurement employing the wing model M, and a flow air corresponding to that during landing is formed in the measurement portion 54, that is, around the wing model M. Here, a case in which the aerodynamic noise measurement is performed by setting the wind speed at 50 m/s will be described.

Figure 36:
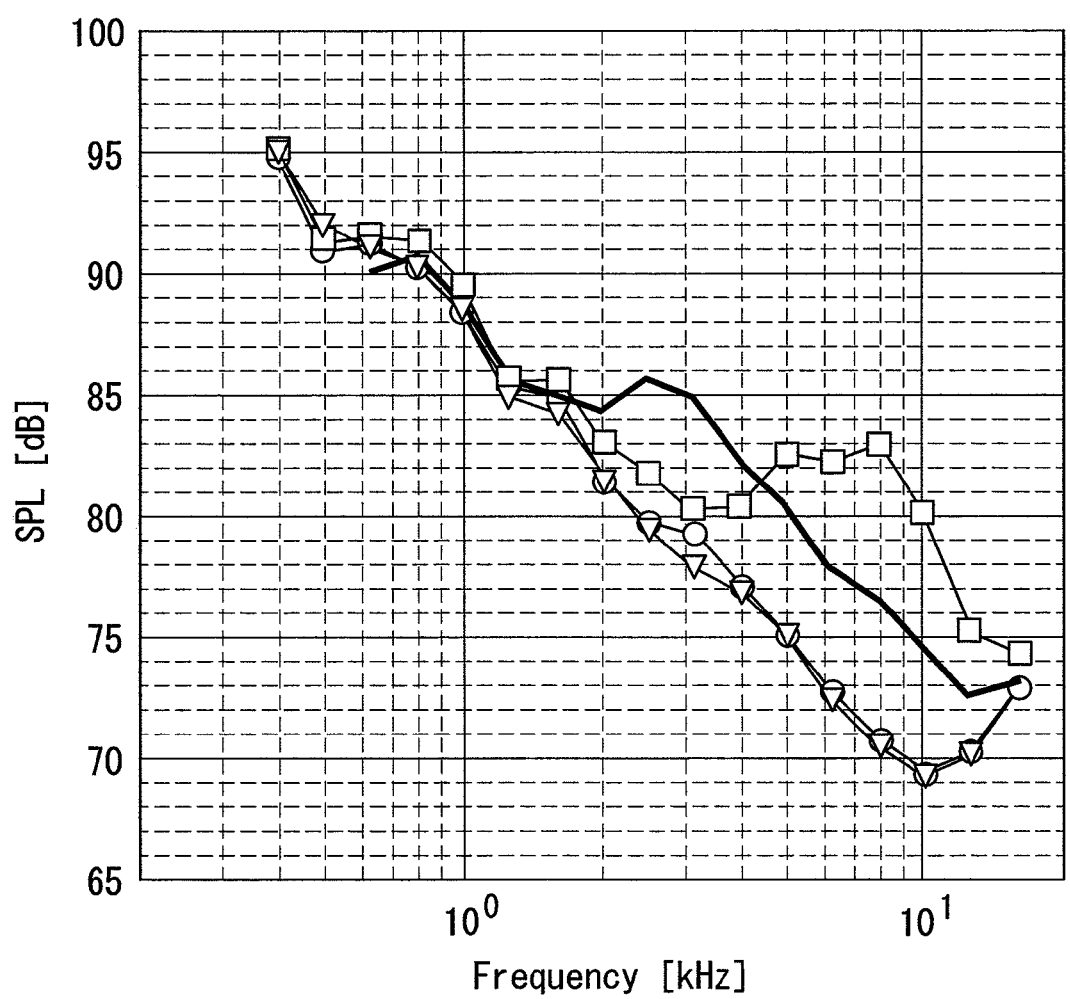
FIG. 36 is a graph for explaining the relationship between frequency and sound pressure level in aerodynamic noise.

Under the above-described conditions, the relationship between the frequency and the sound pressure level for the aerodynamic noise emitted from the wing models M corresponding to the wings 1A-1 and 1B-1 is as shown in FIG. 36. In FIG. 36, a graph indicated by open circles describes the aerodynamic noise related to the wing 1A-1. A graph indicated by downward open triangles describes the aerodynamic noise related to the wing 1B-1.

On the other hand, a graph indicated by a thick solid line describes the aerodynamic noise related to a conventional flap device FP that is not provided with the above-described protruding portion 6A-1. A graph indicated by open squares describes the aerodynamic noise related to a flap device FP having the fence portion disclosed in the above-described Patent Literature 3 that protrudes on the positive-pressure surface side of (downward from) the flap.

As shown in FIG. 36, in a region where the frequency is higher than about 2 kHz, the graphs related to the wings 1A-1 and 1B-1 are below the graph related the conventional flap device FP that is not provided with the protruding portion 6A-1 and, in the region where the frequency is higher than about 3 kHz, they are below the graph related to the flap device FP having the fence portion that protrudes downward.

In other words, in the region where the frequency is higher than about 2 kHz, the sound pressure level of the aerodynamic noise emitted from the wings 1A-1 and 1B-1 is lower than the sound pressure level of the aerodynamic noise emitted from the wing having the conventional flap device FP that is not provided with the protruding portion 6A-1. Furthermore, in the region where the frequency is higher than about 3 kHz, it is lower than the sound pressure level of the aerodynamic noise emitted from the wing having the flap device FP provided with the fence portion protruding downward.

Figure 37:
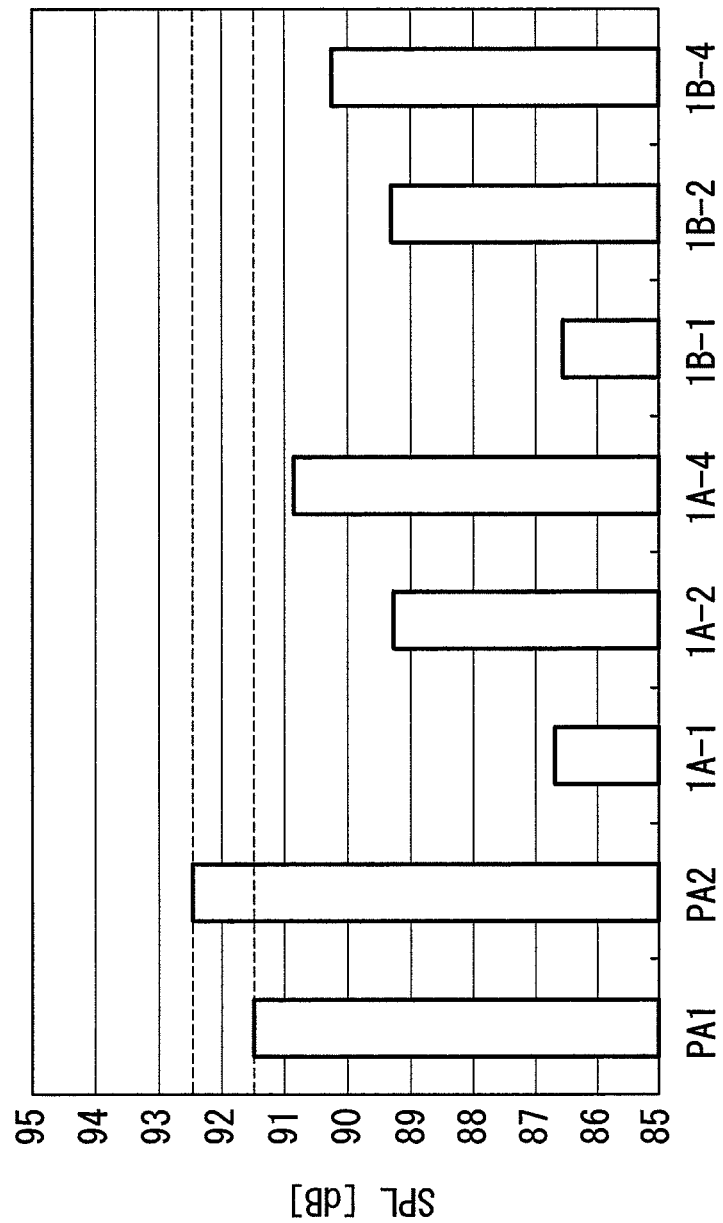
FIG. 37 is a graph in which levels of aerodynamic noise generated from individual wings are compared.

In addition, under the above-described conditions, the relationship of the magnitudes of aerodynamic noise emitted from the wing models M corresponding to the wings 1A-1, 1A-2, 1A-4, 1B-1, 1B-2 and 1B-4 is as shown in FIG. 37.

Bar graphs in FIG. 37 corresponding to 1A-1, 1A-2, 1A-4, 1B-1, 1B-2 and 1B-4 indicate the magnitudes of the aerodynamic noise emitted from the wing models M corresponding to the wings 1A-1, 1A-2, 1A-4, 1B-1, 1B-2, and 1B-4, respectively.

On the other hand, PA1 and PA2 are bar graphs indicating the magnitude of the aerodynamic noise related to the wing having the conventional flap device FP that is not provided with the protruding portions 6A-1. The difference in the magnitude of the aerodynamic noise in these bar graphs PA1 and PA2 indicate the variation in the magnitude of the noise during measurement.

As shown in FIG. 37, the aerodynamic noise emitted from all of the wing models M corresponding to the wings 1A-1, 1A-2, 1A-4, 1B-1, 1B-2, and 1B-4 is lower than the aerodynamic noise related to the wing having the conventional flap device FP that is not provided with the protruding portion 6A-1.

Specifically, the aerodynamic noise emitted from the wing models M corresponding to the wings 1A-1 and 1B-1 is the smallest, and the emitted aerodynamic noise increases in the wing models M corresponding to the wings 1A-2 and 1B-2 and the wing models M corresponding to the wings 1A-4 and 1B-4 in this order.

{Third Embodiment}

Next, a third embodiment of the present invention will be described with reference to FIGS. 38 to 40.

Although the basic configuration of a wing of this embodiment is similar to that of the first embodiment, it differs from the first embodiment with respect to the configuration of the flap device. Therefore, in this embodiment, only the flap device will be described using FIGS. 38 to 40, and descriptions of other configurations, etc. will be omitted.

Figure 38:
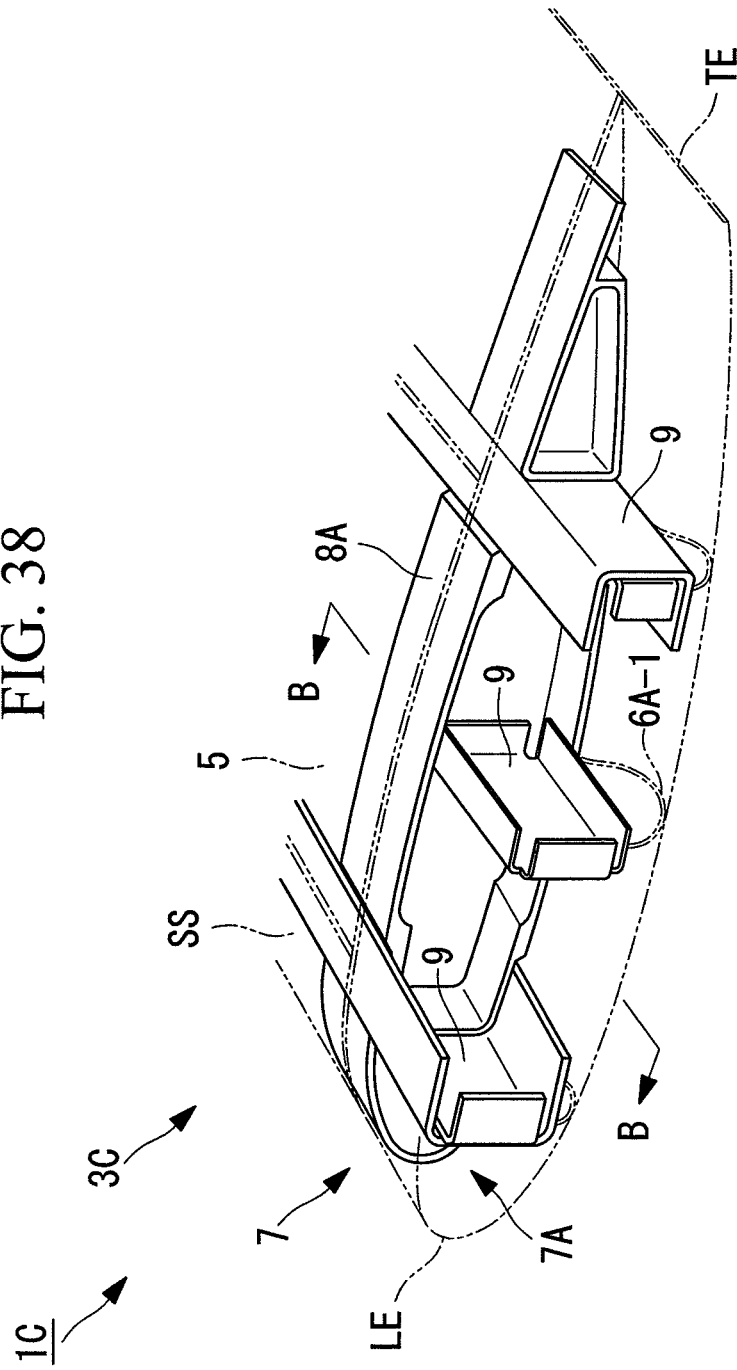
FIG. 38 is a schematic view for explaining the configuration of a protruding portion in a flap device in a wing according to a third embodiment of the present invention.

FIG. 38 is a schematic view for explaining the configuration of a protruding portion in a flap device in a wing according to this embodiment. FIG. 39 is a cross-sectional view taken along B-B for explaining the configuration of a flap main body and attaching/detaching main body in FIG. 38.

Note that components that are the same as those of the first embodiment are given the same reference signs and descriptions thereof will be omitted.

Figure 39:
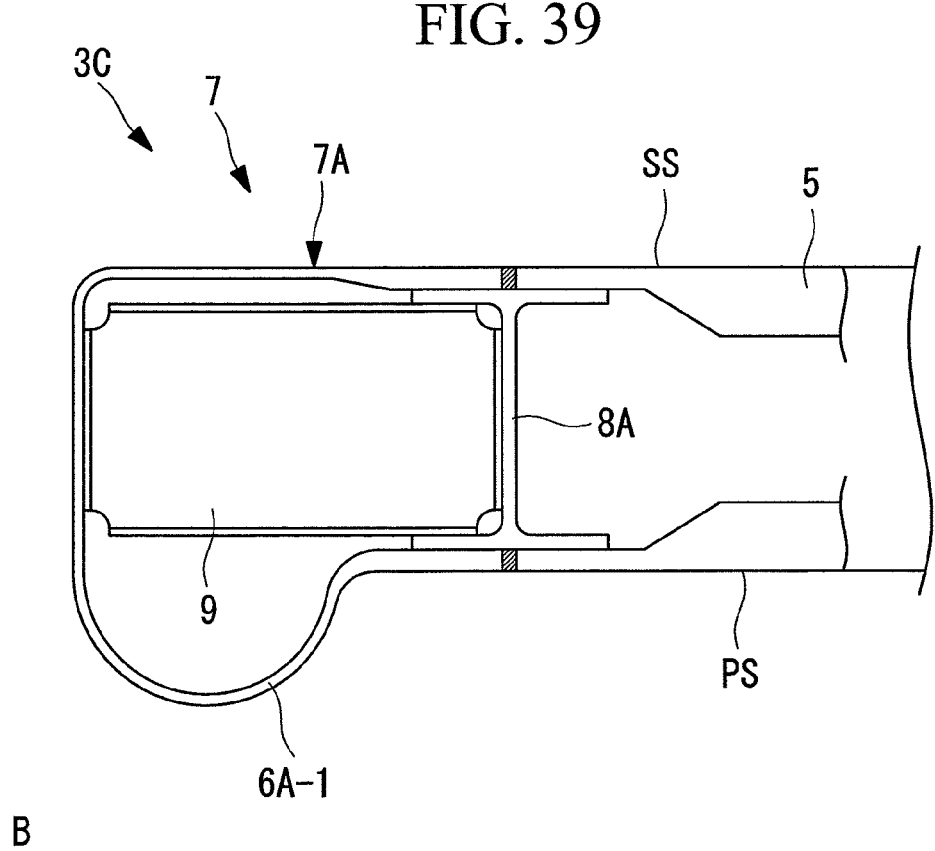
FIG. 39 is a cross-sectional view taken along B-B for explaining the configuration of a flap main body and attaching/detaching main body in FIG. 38.

As shown in FIGS. 38 to 39, a flap device 3C of a wing 1C is provided with the flap main body 5, a noise reduction device 7, and an end-portion rib 8A.

The noise reduction device 7 is provided with an attaching/detaching main body 7A (i.e. an attachable main body) and the protruding portion 6A-1. As shown in FIGS. 38 and 39, the attaching/detaching main body 7A is a member having substantially the same airfoil shape as the flap main body 5 and that is configured so that it can be attached to and detached from the end portion of the flap main body 5.

The protruding portion 6A-1 is integrally formed at a concavely curved positive-pressure surface PS in the attaching/detaching main body 7A. Furthermore, a supplemental brackets 9 employed in attaching to/detaching from the flap main body 5, as well as the end-portion rib 8A, are disposed at the inside of the attaching/detaching main body 7A.

The supplemental brackets 9 are members that extend at the inside of the attaching/detaching main body 7 along the span direction of the flap main body 5 and that are disposed with gaps therebetween in the chord direction. The supplemental brackets 9 are secured to the end-portion rib 8A disposed at the flap main body 5 with fastening members such as supplemental fasteners.

The end-portion rib 8A is a member having a substantially H-shaped cross-section is disposed at the flap main body 5 and that is employed in attaching/detaching of the attaching/detaching main body 7 along with the supplemental brackets 9. The end-portion rib 8A is disposed between the flap main body 5 and the attaching/detaching main body 7A extending in the chord direction of the flap main body 5.

Figure 40:
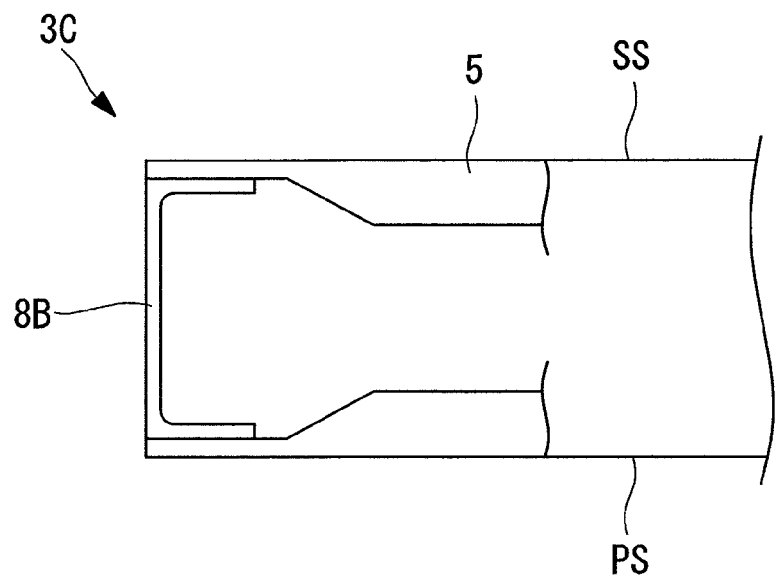
FIG. 40 is a cross-sectional view for explaining a structure in which a noise reduction device is not provided in the flap device in FIG. 39.

FIG. 40 is a cross-sectional view for explaining a structure in which a noise reduction device is not provided in the flap device in FIG. 39.

When the noise reduction device 7 is not provided in the flap device 3C, the flap device 3C is provided with the flap main body 5 and an end-portion rib 8B, as shown in FIG. 40.

Unlike the above-described end-portion rib 8A, the end-portion rib 8B has a shape in which a flange portion that protrudes from the end portion of the flap main body 5 is not provided.

When the flap main body 5 to which the noise reduction device 7 of this embodiment is attached is extended from the main wing, the wing-tip vortex generated at the end portion of the flap main body 5 can be weakened and, additionally, the wing-tip vortex can be moved away from the surface of the flap main body 5.

On the other hand, there is little possibility that retracting/extending of the flap main body 5 is adversely affected. Furthermore, the aerodynamics characteristic at the wing can be prevented from deteriorating.

Because the attaching/detaching main body 7A can be attached to/detached from the flap main body 5, the noise reduction device 7 of this embodiment can be retrofitted to a conventional flap device that is not provided with the noise reduction device 7 of this embodiment.

Note that the technical scope of the present invention is not limited to the above-described embodiments, and various alterations can be added within a range that does not depart from the spirit of the present invention.

Specifically, with the invention of the present application, it suffices that the width and height of the protruding portion smoothly change along the flow direction and that, simultaneously, the cross-sectional area of the protruding portion smoothly changes; the present invention is not limited to the protruding portions 6A-1, 6A-2, 6A-3, 6A-4 and 6A-5 having an arc-like shape viewed from the positive-pressure surface PS and the protruding portions 6B-1, 6B-2, 6B-3, 6B-4, and 6B-5 having rectangular shape as in the individual embodiments described above; it may be a protruding portion having a shape in which a leading edge LE side thereof is arc-like, a trailing edge TE side thereof is rectangular, and an intermediate portion smoothly connects therebetween; it is not particularly limited.

REFERENCE SIGNS LIST 1A-1, 1A-2, 1A-3, 1A-4, 1A-5, 1B-1, 1B-2, 1B-3, 1B-4, 1B-5 wing
2 main wing
3A-1, 3A-2, 3A-3, 3A-4, 3A-5, 3B-1, 3B-2, 3B-3, 3B-4, 3B-5 flap device (high-lift-device)
5 flap main body
6A-1, 6A-2, 6A-3, 6A-4, 6A-5, 6B-1, 6B-2, 6B-3, 6B-4, 6B-5 protruding portion
7 noise reduction device
7A attaching/detaching main body
LE leading edge
TE trailing edge
PS positive-pressure surface

The invention claimed is:

1. A high-lift-device comprising:
a flap main body that is disposed so as to be extendable and retractable relative to a main wing; and
a protruding portion that smoothly protrudes at least at a vicinity of a first end portion in a span direction of a positive-pressure surface of the flap main body in a direction away from the flap main body,
wherein an amount of protrusion of the protruding portion from the flap main body smoothly increases from a leading edge side of the flap main body toward an intermediate portion of the flap main body,
wherein the amount of protrusion of the protruding portion from the flap main body smoothly decreases from the intermediate portion of the flap main body toward a trailing edge side of the flap main body,
wherein the amount of protrusion of the protruding portion from the flap main body smoothly increases from the first end portion of the flap main body toward the intermediate portion of the flap main body in the span direction,
wherein the amount of protrusion smoothly decreases from the intermediate portion of the flap main body toward a second end portion of the flap main body in the span direction,
wherein the protruding portion protrudes continuously from a side surface of the first end portion of the flap main body,
wherein the protruding portion is a smooth, curved surface without an opening on the positive-pressure surface of the flap main body, and
wherein the protruding portion is one of at most only two protruding portions located on the positive-pressure surface of the flap main body.

2. The high-lift-device of claim 1, wherein the protruding portion is formed so as to extend along the first end portion of the flap main body, and
wherein end portions of the protruding portion at the leading edge side and the trailing edge side of the flap main body are shorter in the span direction of the flap main body as compared with substantially a center of the protruding portion.

3. The high-lift device of claim 1, wherein the protruding portion is formed so as to extend along an end portion of the flap main body, and
wherein the length of the protruding portion in the span direction of the flap main body is substantially fixed.

4. A wing comprising:
a main wing; and
the high-lift-device of claim 1,
wherein the high-lift-device is extendable and retractable relative to a trailing edge of the main wing.

5. The high-lift device of claim 1, wherein the protruding portion is formed to have a semicircular cross-section.

6. The high-lift-device of claim 1, wherein the protruding portion is a first protruding portion located only at the first end portion of the flap main body and a second protruding portion is located only at the second end portion of the flap main body.

7. A noise reduction device comprising:
an attachable main body configured to be attachable to and detachable from an end portion in a span direction of a flap main body which is disposed so as to be extendable and retractable relative to a main wing; and a protruding portion that smoothly protrudes from a surface of the attachable main body on a positive-pressure surface side of the flap main body in a direction away from the attachable main body, wherein the protruding portion is a smooth, curved surface without an opening on the positive-pressure surface side of the flap main body, and wherein the protruding portion is one of at most only two protruding portions located on the positive-pressure surface side of the flap main body.

8. The noise reduction device of claim 7, wherein the flap main body has an airfoil shape and the attachable main body is a member having substantially a same shape as the flap main body.

9. The noise reduction device of claim 7, wherein at least one bracket and at least one end-portion rib are disposed at an interior of the attachable main body.

10. The noise reduction device of claim 7, wherein the end portion of the flap main body is a first end portion of the flap main body, the protruding portion is a first protruding portion located only at the first end portion of the flap main body and a second protruding portion is located only at a second end portion of the flap main body.

11. A high-lift-device comprising:

a flap main body that is disposed so as to be extendable and retractable relative to a main wing; and a protruding portion that smoothly protrudes at least at a vicinity of a first end portion in a span direction of a positive-pressure surface of the flap main body in a direction away from the flap main body, wherein an amount of protrusion of the protruding portion from the flap main body smoothly increases from a leading edge side of the flap main body toward an intermediate portion of the flap main body, wherein the amount of protrusion of the protruding portion from the flap main body smoothly decreases from the intermediate portion of the flap main body toward a trailing edge side of the flap main body, wherein the amount of protrusion of the protruding portion from the flap main body smoothly increases from the first end portion of the flap main body toward the intermediate portion of the flap main body in the span direction, wherein the amount of protrusion smoothly decreases from the intermediate portion of the flap main body toward a second end portion of the flap main body in the span direction, wherein the protruding portion protrudes continuously from a side surface of the first end portion of the flap main body, wherein the protruding portion does not protrude beyond a leading edge or a flap side edge end of the flap main body, and wherein the protruding portion is one of at most only two protruding portions located on the positive-pressure surface of the flap main body.

12. The high-lift-device of claim 11, wherein the protruding portion is formed so as to extend along the first end portion of the flap main body, and wherein end portions of the protruding portion at the leading edge side and the trailing edge side of the flap main body are shorter in the span direction of the flap main body as compared with substantially a center of the protruding portion.

13. The high-lift device of claim 11, wherein the protruding portion is formed so as to extend along an end portion of the flap main body, and wherein the length of the protruding portion in the span direction of the flap main body is substantially fixed.

14. A wing comprising:

a main wing; and the high-lift-device of claim 11, wherein the high-lift-device is extendable and retractable relative to a trailing edge of the main wing.

15. The high-lift device of claim 11, wherein the protruding portion is formed to have a semicircular cross-section.

16. The high-lift-device of claim 11, wherein the protruding portion is a first protruding portion located only at the first end portion of the flap main body and a second protruding portion is located only at the second end portion of the flap main body.

17. A noise reduction device comprising:

an attachable main body configured to be attachable to and detachable from an end portion in a span direction of a flap main body which is disposed so as to be extendable and retractable relative to a main wing; and a protruding portion that smoothly protrudes from a surface of the attachable main body on a positive-pressure surface side of the flap main body in a direction away from the attachable main body, wherein the protruding portion does not protrude beyond a leading edge or a flap side edge end of the flap main body, and wherein the protruding portion is one of at most only two protruding portions located on the positive-pressure surface side of the flap main body.

18. The noise reduction device of claim 17, wherein the flap main body has an airfoil shape and the attachable main body is a member having substantially a same shape as the flap main body.

19. The noise reduction device of claim 17, wherein at least one bracket and at least one end-portion rib are disposed at an interior of the attachable main body.

20. The noise reduction device of claim 17, wherein the end portion of the flap main body is a first end portion of the flap main body, the protruding portion is a first protruding portion located only at the first end portion of the flap main body and a second protruding portion is located only at a second end portion of the flap main body.

* * * * *